US011182366B2

(12) United States Patent
Anderson et al.

(10) Patent No.: US 11,182,366 B2
(45) Date of Patent: **\*Nov. 23, 2021**

(54) COMPARING DATA STORES USING HASH SUMS ON DISPARATE PARALLEL SYSTEMS

(71) Applicant: Bank of America Corporation, Charlotte, NC (US)

(72) Inventors: Dirk Anderson, Jacksonville, FL (US); Haresh Kurani, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,702

(22) Filed: Sep. 17, 2019

(65) Prior Publication Data

US 2020/0012631 A1 Jan. 9, 2020

Related U.S. Application Data

(63) Continuation of application No. 15/977,692, filed on May 11, 2018, now Pat. No. 10,459,903, which is a (Continued)

(51) Int. Cl.
*G06F 16/22* (2019.01)
*G06F 16/245* (2019.01)
*G06F 16/23* (2019.01)

(52) U.S. Cl.
CPC ...... *G06F 16/2255* (2019.01); *G06F 16/2365* (2019.01); *G06F 16/245* (2019.01)

(58) Field of Classification Search
CPC .......... G06F 16/24556; G06F 16/2365; G06F 16/2255
See application file for complete search history.

(56) References Cited

U.S. PATENT DOCUMENTS 5,864,842 A 1/1999 Pederson et al.
6,055,537 A * 4/2000 LeTourneau ............. G06F 9/44
(Continued)

OTHER PUBLICATIONS

Handschuh, Helena. "SHA-0, SHA-1, SHA-2 (Secure Hash Algorithm)." Encyclopedia of Cryptography and Security, 2011. 8 pages.*
(Continued)

*Primary Examiner* — Charles E Lu
(74) *Attorney, Agent, or Firm* — Banner & Witcoff, Ltd.; Michael A. Springs

(57) ABSTRACT

Aspects described herein relate to methods and systems for comparing data stored in disparate parallel systems using hash sums. A database having a parallel system architecture may comprise a plurality of nodes each storing a plurality of records. A central node may initiate parallel calculation of a set of node hash sums for each individual node. Calculating a node hash sum for an individual node may comprise calculating, by the individual node, a set of hash values for each individual record of the plurality of records stored by the individual node and combining each hash value of the set of hash values to generate the node hash sum for the individual node. The central processor may combine each node hash sum to generate a database hash sum. The central processor may store the generated database hash sum and/or utilize it in comparisons with database hash sums for other databases.

20 Claims, 11 Drawing Sheets

Related U.S. Application Data continuation of application No. 14/750,133, filed on Jun. 25, 2015, now Pat. No. 10,013,443.

(56) References Cited

U.S. PATENT DOCUMENTS

| | | | |
|---|---|---|---|
| 6,349,292 | B1 | 2/2002 | Sutherland et al. |
| 6,772,163 | B1 | 8/2004 | Sinclair et al. |
| 6,834,279 | B1 | 12/2004 | Chiang |
| 6,845,375 | B1 | 1/2005 | Sinclair |
| 6,999,967 | B1 | 2/2006 | Ghazal et al. |
| 7,035,851 | B1 | 4/2006 | Sinclair et al. |
| 7,080,072 | B1 | 7/2006 | Sinclair |
| 7,085,769 | B1 | 8/2006 | Luo et al. |
| 7,113,957 | B1 | 9/2006 | Cohen et al. |
| 7,136,861 | B1 | 11/2006 | Sinclair et al. |
| 7,213,025 | B2 | 5/2007 | Sinclair et al. |
| 7,319,995 | B2 | 1/2008 | Chiang |
| 8,145,642 | B2 | 3/2012 | Cruanes et al. |
| 8,150,836 | B2 | 4/2012 | Xu et al. |
| 8,359,472 | B1 | 1/2013 | Ren et al. |
| 8,543,596 | B1 | 9/2013 | Kostamaa et al. |
| 8,782,364 | B2 | 7/2014 | Vandiver et al. |
| 8,788,841 | B2 | 7/2014 | Aciicmez et al. |
| 8,843,435 | B1 | 9/2014 | Trefler et al. |
| 2005/0262044 | A1 | 11/2005 | Chaudhuri et al. |
| 2005/0289125 | A1* | 12/2005 | Liu .............. G06F 16/2448 |
| 2013/0097157 | A1 | 4/2013 | Ng et al. |
| 2015/0149503 | A1* | 5/2015 | Wollrath .......... G06F 16/1858 707/770 |

OTHER PUBLICATIONS

Wikipedia, "MapReduce," 13 pages as provided dated May 7, 2015, http://en.wikipedia.org/wiki/MapReduce, accessed May 8, 2015.

Wikipedia, "Apache Hadoop," 12 pages as provided dated May 8, 2015, http://en.wikipedia.org/wiki/Apache_Hadoop, accessed May 8, 2015.

Teradata, "Teradata Solution Technical Overview," 13 pages as provided dated Feb. 2014, http://assets.teradata.com/resourceCenter/downloads/Brochures/EB3025_2.pdf!processed=1, accessed May 8, 2015.

Ulrich Arndt, "Calculation of Table Hash Value to Compare Table Content," 3 pages (dated May 21, 2013), available at <https://developer.teradata.com/print/181777>.

Ulrich Arndt, "How to compare tables between TD systems in a dual active environment," 55 pages (undated, retrieved Jun. 3, 2015), available at <https://developer.teradata.com/sites/all/files/2289_Arndt_0.pdf>.

* cited by examiner

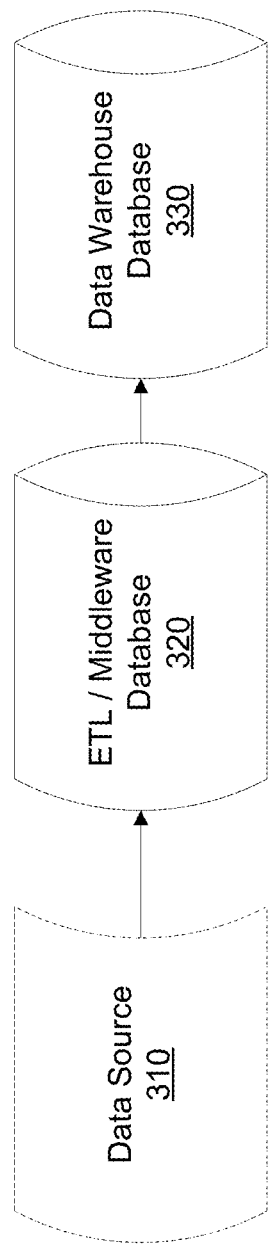

311

```
<customers>
  <customer customerid="#######1">
    <accountid>$$$$$$$1</accountid>
    <name>
      <first>FIRSTNAME</first>
      <middle>MIDDLE</middle>
      <last>LASTNAME</last>
    </name>
    <address>
      <street>#### STREET ST</street>
      <city>CITY</city>
      <state>STATE</state>
      <zip>ZIPZI-PZIP</zip>
      <country>COUNTRY</country>
    </address>
    ...
  </customer>
  ...
</customers>
```

| | A | B | C | D | E | F | G | H |
|---|---|---|---|---|---|---|---|---|
| 1 | CUSTOMER ID | ACCOUNT ID | LAST | FIRST | MIDDLE | STREET | CITY | STATE |
| 2 | #######1 | $$$$$$$1 | LASTNAME | FIRSTNAME | MIDDLE | #### STREET ST | CITY | STATE |
| 3 | #######2 | $$$$$$$2 | LASTNAME2 | FIRSTNAME2 | MIDDLE2 | ###1 STREET ST | CITY1 | STATE |
| 4 | #######3 | $$$$$$$3 | LASTNAME3 | FIRSTNAME3 | MIDDLE3 | ###2 STREET ST | CITY2 | STATE |
| 5 | #######4 | $$$$$$$4 | LASTNAME4 | FIRSTNAME4 | MIDDLE4 | ###3 ROAD RD | CITY3 | STATE |

FIG. 3C

COMPARING DATA STORES USING HASH SUMS ON DISPARATE PARALLEL SYSTEMS

CROSS-REFERENCE TO RELATED APPLICATIONS

This application is a continuation of application Ser. No. 15/977,692, filed May 11, 2018, which is a continuation of application Ser. No. 14/750,133, filed Jun. 25, 2015, both of which are hereby incorporated by reference in their entirety.

BACKGROUND

Aspects of the disclosure relate to computer hardware and software. In particular, one or more aspects of the disclosure generally relate to calculating hash sums on databases implemented using parallel system architectures.

In modern commerce, customer information is maintained in a diverse array of database formats. Certain database formats may be preferred for initial intake and processing of customer data, while other formats may be more suitable for long term storage of the customer data. Other formats still may be better suited for analyzing the customer data. With very large databases, it may be preferable to utilize a database having a parallel system architecture. Such databases may include a plurality of nodes that each store a portion of the database. Many such parallel system architectures exist, with commercial options including parallel file systems such as Apache Hadoop and parallel databases such as Teradata Database.

It is frequently necessary to copy data from one database to another. For example, data may be transferred from an originating source or database to a data warehousing database in a process known as Extract, Transform, and Load (ETL). It is desirable to be able to confirm that the content of one database was accurately transferred to the other database. Best practices and/or regulations may require that operators confirm that data loaded into a data warehouse matches the data that was received from a customer. Some techniques for comparing databases include comparing check sums, record counts, byte counts, or column sums. However, each of these techniques fails to guarantee that the content of two databases is byte-for-byte the same. An additional problem is presented by disparate types of parallel systems, as existing techniques may require that the data in one parallel system be transferred to a single node, sorted, and processed further before a comparison can be made. This approach has numerous disadvantages, as it introduces a bottleneck at the single node and discards the many advantages provided by parallel systems.

SUMMARY

Aspects of the disclosure relate to various systems and techniques that facilitate efficient and accurate transfer of information from one database to another. In particular, some aspects of the disclosure provide for the calculation of a hash sum for a database having a parallel system architecture utilizing parallel processing at a plurality of nodes in the database. According to some embodiments, individual nodes may calculate a combined hash sum for each record stored at the node, and the hash sums from each node may be combined to generate a hash sum for the entire database. The hash sum for a database may be used, for example, to compare the database with another database to determine whether content of the two databases is equivalent. In some embodiments, the method may generate more than one hash sum for a database using different aggregation functions to further ensure accurate results even when a database may include duplicate records. Some aspects described herein may find particular use in determining whether the content of a middleware or source database was accurately transferred to a data warehouse database.

Some aspects described herein may provide systems and methods for computing a database hash sum for a database. The database may have a parallel system architecture comprising a plurality of nodes, where each node has one or more processors and stores one or more records of the database. The method may be performed by a master node and/or a controller of the database, in some embodiments. The method may include initiating the calculation of a set of node hash sums for each individual node of the plurality of nodes. The method may further include combining each node hash sum of the set of node hash sums to generate the database hash sum and storing the database hash sum.

According to some aspects, calculating a node hash sum for an individual node may include calculating, by a processor of the individual node, a set of hash values for each individual record of a plurality of records stored at the individual node. Calculating a hash value for an individual record may include retrieving the individual record, preprocessing one or more fields of the individual record to generate a record value, and calculating the hash value for the individual record based on the record value. The individual node may combine each hash value of the set of hash values to generate the node hash sum for the individual node. In some embodiments, the calculation of the set of node hash sums may include parallel processing by the individual nodes, wherein each individual node calculates a respective node hash sum of the respective individual node concurrently.

In some embodiments, the preprocessing of the one or more fields of the individual record may be based on one or more preprocessing rules associated with the parallel system architecture of the database. In some embodiments, preprocessing may include modifying a field of the one or more fields by at least one of casting a data type of the field to a different data type, removing trailing characters in the field, removing leading characters in the field, and replacing one or more characters in field with replacement characters. For example, preprocessing may include removing and/or replacing one or more delimiters in the fields of the record. Preprocessing may also include concatenating at least two fields of the one or more fields to generate the record value. In some embodiments, each field of the one or more fields may be concatenated together to generate the record value. In other embodiments, less than all of the fields may be combined and other fields may be omitted, such as calculated fields or later-added information. The fields may be concatenated in a first field order different from a logical field order of the database. For example, a preprocessing rule associated with the parallel system architecture may specify concatenation logic for the fields of the records stored at each node.

According to some aspects, the method may further include comparing the stored database hash sum with a second database hash sum. The second database hash sum may be associated with a different database having a second parallel system architecture different from the parallel system architecture of the database. In some embodiments, a first parallel system architecture of a first database may be of a first type and the second parallel system architecture of the second database may be of a second type different from the first type. For example, the first database may be a parallel file system such as an Apache Hadoop database and the second database may be a parallel database such as a Teradata database. The above method may be used to calculate a hash sum for the first database, the second database, or both, and the hash sum for the first database may be compared to the hash sum for the second database. Based on the comparison, a master node may determine whether content of the two databases is equivalent, for example. Any other appropriate action may be taken based on a result of the comparison. As one other example, the system may initiate error checking to detect a portion of the content of the database that does not match the source database when the hash sums do not match.

In some embodiments, the plurality of records stored at the individual node and used to determine a node hash sum may be a subset of all the records stored at the individual node. A user of the database system may specify a range and/or criteria for selecting a subset of all records stored at the individual node and/or in the database. A hash sum for a database that was computed for a subset of the records in the database may be compared with a hash sum for another database that was computed over a corresponding subset of records in the other database. For example, the calculation of a first database hash sum for a first database may be limited to new records gathered in the last month, and the first database hash sum may be compared with a second database hash sum for a second database that was similarly limited to records gathered in the last month. Any other suitable criteria may be used to specify a subset of the records stored at the individual nodes and/or in the databases.

Other aspects described herein may provide a database management system comprising at least one processor and memory storing computer readable instructions that, when executed by the at least one processor, configure the database management system to perform steps to compare two databases each having parallel system architectures. The steps may include a step of initiating calculation of a first database hash sum for a first database having a first parallel system architecture, wherein the first database hash sum is calculated by parallel processing on a first plurality of nodes of the first database. The steps may further include a step of initiating calculation of a second database hash sum for a second database having a second parallel system architecture, wherein the second database hash sum is calculated by parallel processing on a second plurality of nodes of the second database. The database management system may compare the first database hash sum and the second database hash sum and output a result of the comparison. In some embodiments, the database management system may determine that content in the first database is equivalent to content in the second database when the first database hash sum matches the second database hash sum.

In some embodiments, the first parallel system architecture and the second parallel system architecture may be different types of parallel system architecture. The first database may have a first number of nodes and the second database may have a second number of nodes different from the first. For example, the first database may be a middleware database, such as an Apache Hadoop database with 100 nodes, while the second database may be a data warehousing and analytics database, such as a Teradata database with 1000 nodes. Records of the databases may be distributed differently depending on the type of parallel system used, the number of nodes used, and/or the capabilities of each node.

Other aspects described herein provide a database system having a parallel system architecture. The database system may include a plurality of nodes, and each individual node of the plurality of nodes may have one or more respective processors and may store a plurality of records. The plurality of records may be a subset of the records stored in the database system, and, in some embodiments, records may be duplicated at two or more nodes. The database system may have a central and/or master node comprising at least one central processor. The master node may further include memory storing processing instructions. The memory may also store a table map, table definition, data dictionary, master table, and/or any suitable data to manage the plurality of nodes in the parallel system architecture. The master node may initiate parallel calculation of a set of node hash sums for each individual node of the plurality of nodes. Calculating a node hash sum for an individual node may include calculating, by one or more respective processors of the individual node, a set of hash values for each individual record of the plurality of records stored by the individual node and combining each hash value of the set of hash values to generate the node hash sum for the individual node. The central processor may receive the node hash sum from each individual node and may combine each node hash sum to generate a database hash sum. The central processor may store the generated database hash sum and/or utilize it in comparisons with database hash sums for other databases.

In some embodiments, calculating a hash value for an individual record may include the respective individual node retrieving the individual record, preprocessing one or more fields of the individual record to generate a record value, and calculating the hash value for the individual record based on the record value. Preprocessing the one or more fields of the individual record may be based on one or more preprocessing rules associated with the parallel system architecture of the database system and may include concatenating values of the one or more fields to generate the record value.

Other aspects described herein relate to a robust method for comparing first content stored in a first database having a first parallel system architecture with second content stored in a second database having a second parallel system architecture different from the first parallel system architecture. The method may include initiating calculation of a first database hash sum for the first database, wherein the first database hash sum is calculated by parallel processing on a first plurality of nodes of the first database using a first aggregation function. The method may further include initiating calculation of a second database hash sum for the first database, wherein the second database hash sum is calculated by parallel processing on the first plurality of nodes using a second aggregation function different from the first aggregation function. The method may include initiating calculation of a third database hash sum for the second database, wherein the third database hash sum is calculated by parallel processing on a second plurality of nodes of the second database using the first aggregation function. The method may further include initiating parallel calculation of a fourth database hash sum for the second database, wherein the second database hash sum is calculated by parallel processing on the second plurality of nodes using the second aggregation function. The first database and the second database may be evaluated based on a comparison of the first database hash sum with the third database hash sum and the second database hash sum with the fourth database hash sum. Based on the comparison, an administrator may be able to determine whether the first content of the first database and the second content of the second database are equivalent. For example, the content may be determined to be equivalent when the first database hash sum matches the third database hash sum and the second database hash sum matches the fourth database hash sum.

In some embodiments, the method may further include determining whether the first database and/or the second database is configured to support duplicate records. If either or both support duplicate records, the method may proceed as above to calculate the second and fourth database hash sums using the second aggregation function. If neither database supports duplicates, the method may omit calculating the second and fourth database hash sums. In some embodiments, the first aggregation function may be a general-purpose function suitable for quickly calculating hash sums for most databases, such as an XOR-function. The first aggregation function may be selected based on its ability to efficiently and quickly calculate hash sums for databases that do not support duplicate rows. In some embodiments, the second aggregation function may be a summation function suitable for accurately calculating hash sums for databases that may contain duplicate records, such as a base-10 addition function. In some embodiments, the summation function may include steps of converting a hash value to one or more integers and adding the converted hash value to a running hash sum for a node and/or database.

In some embodiments, initiating calculation of the first database hash sum for the first database (or any of the other database hash sums) may be performed similarly to the other methods set forth above. Initiating calculation of a database hash sum may include initiating calculation of a set of node hash sums for each individual node of the first plurality of nodes. Calculating a node hash sum for an individual node may include calculating, by a processor of the individual node, a set of hash values for each individual record of a plurality of records stored at the individual node and combining, using the first aggregation function, each hash value of the set of hash values to generate the node hash sum for the individual node. The set of node hash sums may be combined using the first aggregation function to generate the first database hash sum. The method may further include preprocessing steps in accordance with preprocessing rules associated with the first database and/or the second database. The first database and the second database may have different preprocessing rules based on the type of parallel system architecture employed and their respective configurations.

By leveraging various aspects of these techniques and/or the other features and functionalities discussed in greater detail below, data managers may quickly and accurately determine whether data has been successfully copied and/or imported from one database to another, even where the two databases are different types of parallel systems. Through use of two or more aggregation functions to calculate additional hash sums for the database, the method may be robust even in the case that one or both databases are configured to support duplicate records. Various embodiments discussed in greater detail below can reduce processing time by leveraging parallel processing to compute hash sums for a database having a parallel system architecture. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A, 3B, and 3C illustrate an example scenario in which two databases having different parallel system architectures may be used, as well as illustrative examples of how data may be stored differently in different parallel systems;

DETAILED DESCRIPTION

Figure 1A:
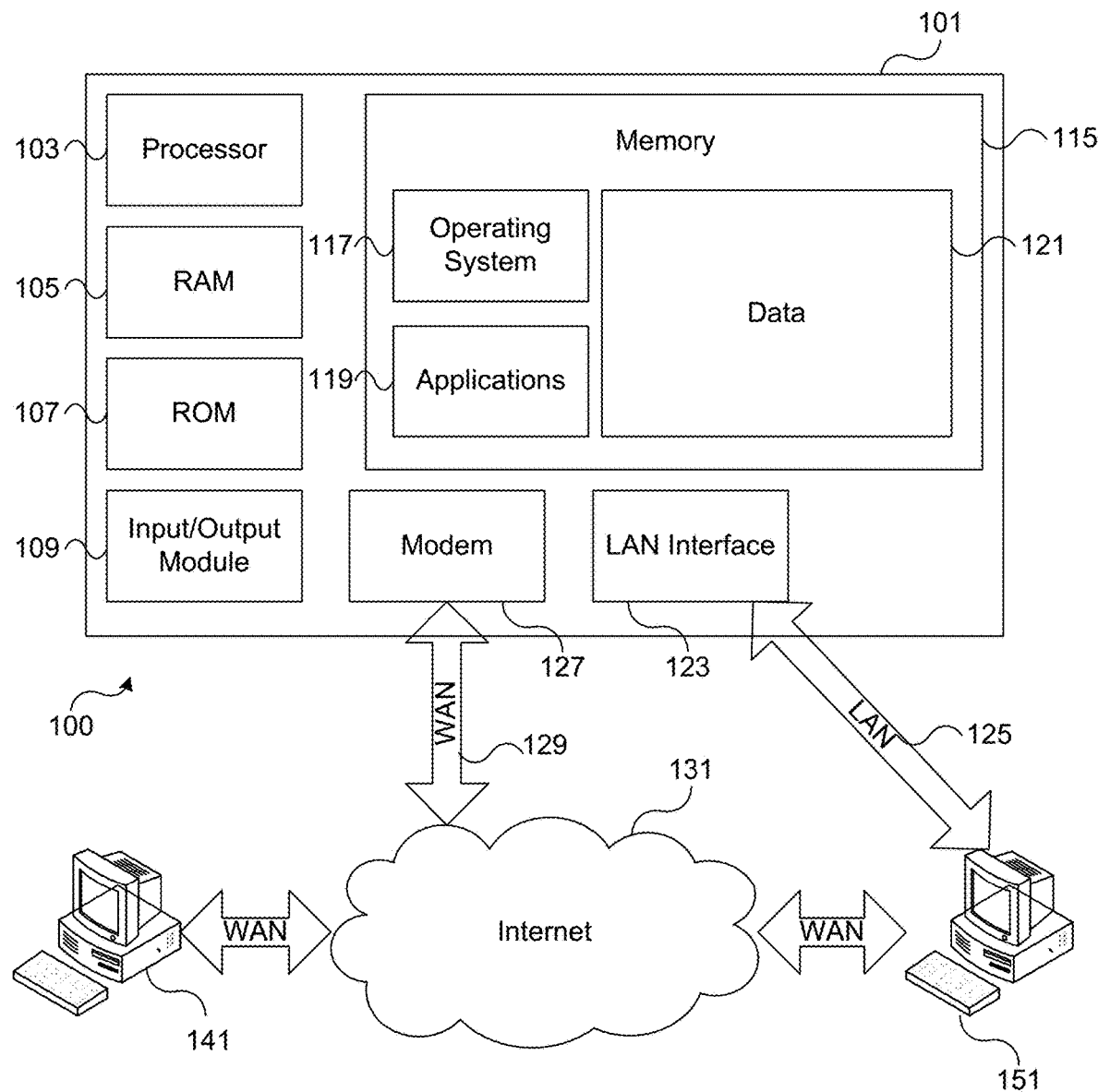
FIG. 1A illustrates an example operating environment in which various illustrative aspects of the disclosure may be implemented.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As described above, some aspects described herein may relate to calculating a hash sum for a database that is implemented using a parallel system architecture. In accordance with one or more aspects described herein, the calculation of the hash sum for the database may be deterministic with regard to the data content stored in the database while taking into account the particular type of parallel system architecture used to implement the database. As a result, the same content stored in two different databases having different parallel system architectures may hash to a same value, and the hash sums for each database may be used to compare the content of the two databases even though they may store data in very different formats, according to some aspects. For example, a first database may store customer records in a parallel file system such as Apache Hadoop. Records of the first database may be distributed across a plurality of nodes in the first database and may be stored as plain text in structured files. Continuing the example, a second database may store customer records in a parallel database such as Teradata database. Records of the second database may be distributed across a plurality of nodes in the second database and may be stored as rich text data in tabular form.

The database hash sum calculation, according to some aspects designed herein, may leverage the parallel system architecture of the database to calculate a hash sum for the database using parallel processing on the individual nodes of the database. Parallel systems may partition the records of the database out among a plurality of individual nodes in the database. The hash sum calculations may run in parallel on each of the individual nodes, in some embodiments. An individual node may calculate a hash value for each record stored at the individual node and combine the hash value for each record to generate a node hash sum for the records stored at the individual node. The node hash sums for each node in the database may then be combined to generate a database hash sum for the database.

According to various aspects described herein, one or more preprocessing rules may be used to preprocess fields of the records stored at the individual nodes based on the particular parallel system architecture used by the first and second databases, respectively. For example, the preprocessing rules may include removing text delimiters from fields of the first database and removing trailing blanks from fields of the second database. Many other preprocessing rules may be utilized, as described further herein. The preprocessing may further include concatenating the fields of the record together to generate a concatenated record value. The concatenated record value may be in a standard and/or universal form due to the particular preprocessing and concatenation logic associated with the particular parallel system architecture of the database being processed. Once a standardized record value has been generated, an individual node may calculate a hash value for the content of the record based on the record value. Then, as described above, the individual node may combine the hash values for each record stored at the node to generate a node hash sum. The node hash sums corresponding to each node in the database may be combined to generate a database hash sum for the database, and this database hash sum may be compared to a hash sum calculated for another database, even where the other database has a different parallel system architecture. In some embodiments, the method may generate more than one hash sum for a database using different aggregation functions to further ensure accurate results even when a database may include duplicate records.

As noted above, certain embodiments are discussed herein that relate to comparing databases having disparate parallel systems through efficient calculation of hash sums using parallel processing across individual nodes of the databases. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
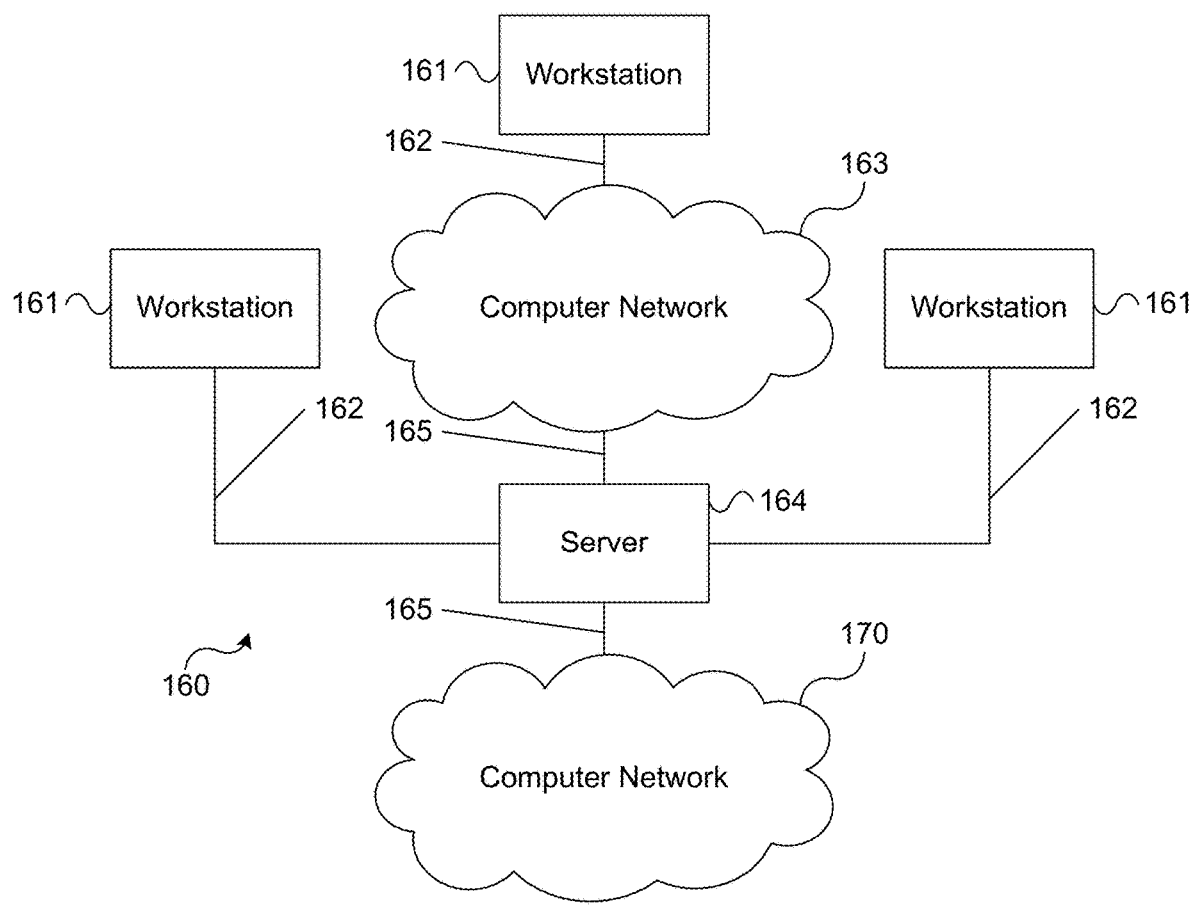
FIG. 1B illustrates another example operating environment in which various illustrative aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hardwired links, and/or the like.

Having described an example of a computing device that can be used in implementing various aspects of the disclosure and an operating environment in which various aspects of the disclosure can be implemented, several embodiments will now be discussed in greater detail.

As introduced above, some aspects of the disclosure generally relate to comparing data stores using hash sums on disparate parallel systems. In the discussion below, various examples illustrating how hash sums may be calculated on disparate parallel systems and used to compare content of different databases in accordance with one or more embodiments will be provided.

Figure 2A:
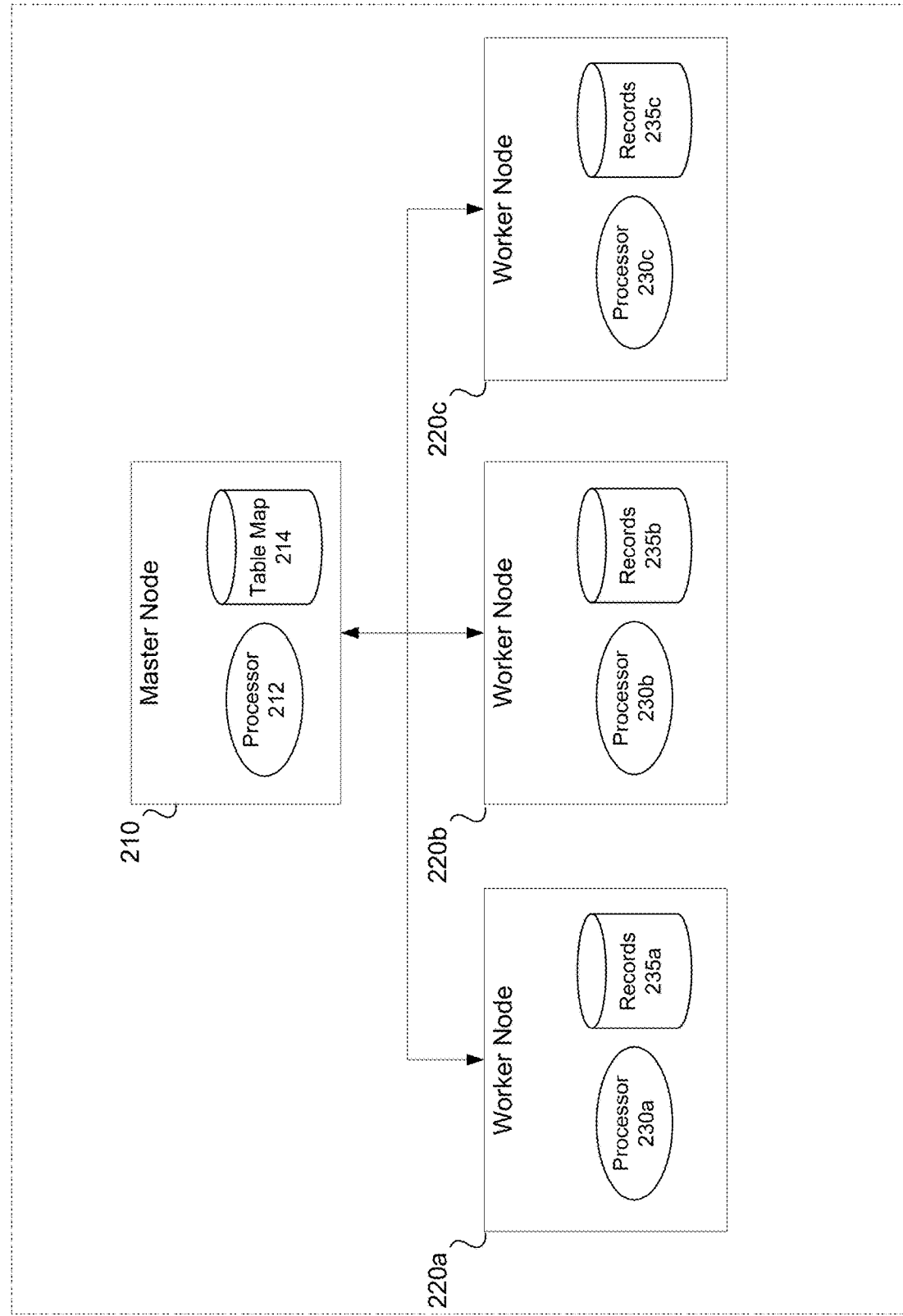
FIGS. 2A and 2B illustrate example database systems having parallel system architectures and comprising a plurality of physical and/or virtual nodes.

FIG. 2A illustrates an example of a parallel system architecture for a database 200. Database 200 may be implemented using a parallel system architecture with one or more worker nodes 220a-c (collectively "worker nodes 220") and a master node 210, wherein each worker node 220a-c stores and processes a portion of the records stored in the database under the command of master node 210. Master node 210 and worker nodes 220 may be implemented in one or more computing devices, which may include and/or incorporate one or more processors, one or more memories, and/or one or more aspects of the computing device 101 discussed above. In some instances, master node 210 and worker nodes 220a-c may include any number of different subsystems, modules, databases, and/or libraries, as appropriate. Although three worker nodes 220a-c are illustrated in FIG. 2A, it should be understood that database 200 may be implemented with any number of worker nodes. In some embodiments, there may be more than one master node 210, particularly where the size of database 200 or the number of worker nodes becomes large. In some embodiments, features of the master node 210 may be implemented by one or more of the worker nodes 220 and the master node 210 may be an optional component. Further, the master node 210 may itself implement features of the worker nodes 220, such as storing and/or processing a portion of the records. Many different parallel system architectures are available and it will be understood that aspects described herein may be adapted for use on many disparate parallel systems.

Each worker node 220a-c may be configured to store and/or process a portion of the records maintained in database 200 according to the parallel system architecture used to implement database 200. The worker nodes 220 may each have one or more respective processors 230a-c and memory storing one or more records 235a-c of database 200. Records in the database 200 may be distributed among worker nodes 220 in a manner specified by the particular parallel system architecture and configuration used to implement database 200. In some embodiments, a record may be stored at more than one worker node to provide redundancy, if desired.

Master node 210 may be configured to orchestrate storage and processing of data stored in database 200 by worker nodes 220. Master node 210 may have one or more processors 212 and may store a table map 214 to keep track of the location of records in database 200 (at one or more of worker nodes 220). Although FIG. 2A illustrates master node 210 storing a table map, any suitable data may be stored by the master node 210 to manage the plurality of nodes in the parallel system architecture, such as a table definition, data dictionary, master table, and the like. The type of data stored and its location may depend on the type of parallel architecture system used to implement database 200. In parallel system architectures that do not incorporate a master node, one or more of the worker nodes 220 may store information identifying storage, processing, and/or data distribution logic for the parallel system.

An individual worker node may receive commands from the master node 210 to perform an operation on the records stored at the individual node, and may return a result of the operation to the master node 210 or other node. This operation may be performed in parallel with other individual nodes of the worker nodes 220 and each node may perform the operation concurrently (or at least substantially at the same time, as some nodes may store less records than others and/or have different processing capabilities). Master node 210 may receive a command from a user requesting that an operation be performed on database 200. Many operations are available for interacting with data stored in the database, such as queries, sorts, data joins, adding records, removing records, modifying records, copying records, or the like. One such operation that may be performed on the database 200 is calculation of a hash sum for the database 200 according to aspects described herein.

As will be described further herein, databases having a parallel system architecture may be able to leverage parallel processing on each node to efficiently perform operations over a very large dataset distributed across the individual nodes of the database. The master node 210 may generate and/or transmit instructions for the worker nodes 220 to process the associated records stored by the individual worker nodes. Users may specify that the operation be limited to a subset of the records stored in the database, such as those records that match a user defined query. Any suitable criteria may be used to define a subset of the records for use in a parallel processing operation, such as all new records within the last week or all records having a last name that begins with a specified letter. Based on the stored table map and/or according to the rules of the parallel system architecture used, the master node 210 issues instructions to the appropriate worker nodes 220 to begin processing their respective records an execute the operation over the respective records. The master node 210 may collect the results from the individual nodes and provide an aggregate result to the user.

Figure 2B:
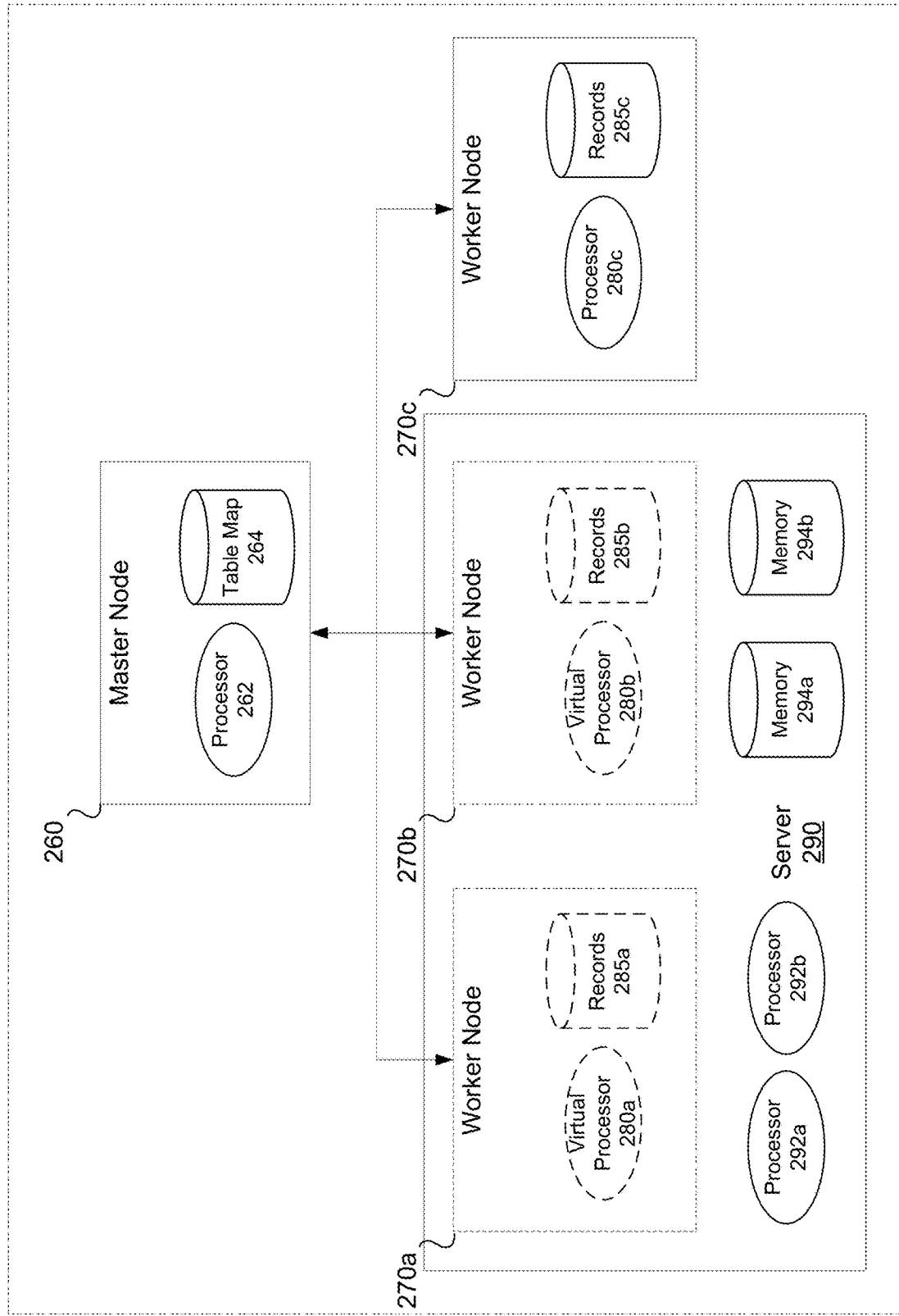

FIG. 2B provides another example of a parallel system architecture that may be used according to some aspects described herein. In the example of FIG. 2B, database 250 may be implemented using a parallel system architecture that incorporates one or more virtual worker nodes 270a-b hosted on server 290 and one or more physical worker nodes 270c. Server 290 may have, for example, multiple processors 292a-b and multiple memory devices 294a-b. Server 290 may host and/or be logically divided into one or more virtual worker nodes 270a-b each having associated one or more respective virtual processors 280a-b and storing associated records 285a-b of database 250. Physical worker node 270c may similarly have one or more respective processors 280c and store records 285c of the database 250. The worker nodes 270a-c may operate under the direction of a master node 260, having a processor 262 and a table map 264 or other suitable data for identifying how the records of database 250 are stored across the worker nodes 270a-c. Though processors 292*a-b* and memory 294*a-b* may be commonly installed on server 290, the logical structure of virtual worker nodes 270*a-b* may be such that each worker node has dedicated processing and storage resources that are not shared with the other worker node. For example, processors 292*a* may be reserved for use by worker node 270*a* and processor 292*b* may be reserved for use by worker node 270*b*.

Commercially available examples of parallel system architectures for databases include parallel file systems, or file-oriented parallel data stores, such as Apache Hadoop and parallel databases, or table-oriented parallel data stores, such as Teradata database. Some parallel system architectures may be characterized as massively parallel systems having a shared-nothing architecture. Each node may have dedicated processing resources and dedicated storage, thereby not sharing resources with other nodes. Such systems may be on the order of hundreds, thousands, or even more individual nodes. Other examples of parallel system architectures, which may also be referred to as parallel database architectures, may include the Vertica database from Hewlett-Packard or distributed databases, such as the Mongo database. Different types of parallel system architectures may vary based on how records are distributed among the worker nodes, how work is performed across the worker nodes, how the database is organized and/or reorganized, what operations are permitted and/or supported by the database, how managing nodes and worker nodes interact, how records are stored in files, tables, and/or other suitable data structures, and in many other ways known to those of skill in the art.

FIG. 3A illustrates an example of a system in which database having disparate types of parallel systems may be used. In the example of FIG. 3A, customer data (or any other suitable data) may be received from a data source 310. As used herein, the term "customer" is not intended to be limited to persons or entities having a customer relationship with the provider of the system. Rather, a customer may be any person or entity about which customer data may be recorded and/or stored. Customer data may include one or more information items used to identify a person, entity, or attributes thereof. For example, in some embodiments customer data may include information items such as first name, last name, middle name, previous names, generation code, social security number, street address, city, state, zip code, telephone number, date of birth, taxpayer identification number, account number, order number, and/or any other information used to identify a persons or entity or their attributes. Customer data may include account information, credit information, employment information, and/or any other information items related to the customer.

Data source 310 may be, for example, a data entry platform for users and/or customers to provide initial input of customer data. As another example, data source 310 may be an existing database storing records of previously gathered customer data. Data source 310 may be, for example, a database that has a parallel system architecture as described above. Or, as another example, data source 310 may be a traditional database that does not make use of a parallel system architecture.

Customer data (or any other suitable data) may be transmitted and/or transformed to ETL/middleware database 320. As described above, Extract, Transform, and Load processes (ETL) may be utilized to extract input data, transform it into a suitable format, and load it into a database for storage, analytics, or any other suitable purpose. As illustrated in FIG. 3A, it may be useful to utilize an ETL and/or middleware database 320 as part of or in addition to an ETL process that loads the data from data source 310 into a data warehouse database 330. For example, a staging database may be used to store input customer data while additional data is gathered prior to batch loading into a data warehousing database 330. Middleware database 320 and data warehouse database 330 may each be implemented using a parallel system architecture, and the two databases may utilize different parallel system architectures. As one specific example, the data source 310 may be a user frontend for inputting customer data, ETL database 320 may be a parallel file system database, or file-oriented parallel data store, such as Apache Hadoop for short term storage of the customer data, and data warehouse database 330 may be a parallel database, or table-oriented parallel data store such as Teradata database for long term storage and analysis of the customer data.

It may be desirable to confirm whether data was accurately loaded into the data warehouse database 330 from data source 310 and/or ETL database 320. Best practices and/or industry regulations may require that data managers confirm that data stored in data warehouse database 330 matches data that was received from the customer and/or data stored in middleware database 320. For some applications, it may be sufficient to perform a simple comparison of check sums, record counts, byte counts, or column sums of databases 320 and 330 to determine whether a discrepancy exists. However, such methods do not ensure that the content of the two databases is byte-for-byte equivalent. According to some aspects described herein, it may be possible to efficiently confirm whether the content of middleware database 320 and data warehouse database 330, or any other desired databases, are byte-for-byte equivalent using hash sums calculated by parallel processing on individual nodes of the databases.

Comparing middleware database 320 to data warehouse database 330 may be complicated by differences in the parallel system architectures employed by each database. The middleware database may be implemented using a first type of parallel system architecture, such as a parallel file system. The middleware database 320 may store data in files at each node according to a data schema. One example of this is shown in FIG. 3B, which illustrates an example data record 311 that may be used in a first parallel system architecture. Data records may be stored in tag and/or character delimited files as specified in a schema and/or data definition. Returning to FIG. 3A, the data warehouse database 330 may store data in tables at each node according to a table definition. One example of this is shown in FIG. 3C, which illustrates an example table 321 storing multiple data records that may be used in a second parallel system architecture. Due to differences in how the databases store data records, traditional methods may have difficulty comparing two databases that have disparate parallel system architectures.

Figure 4A:
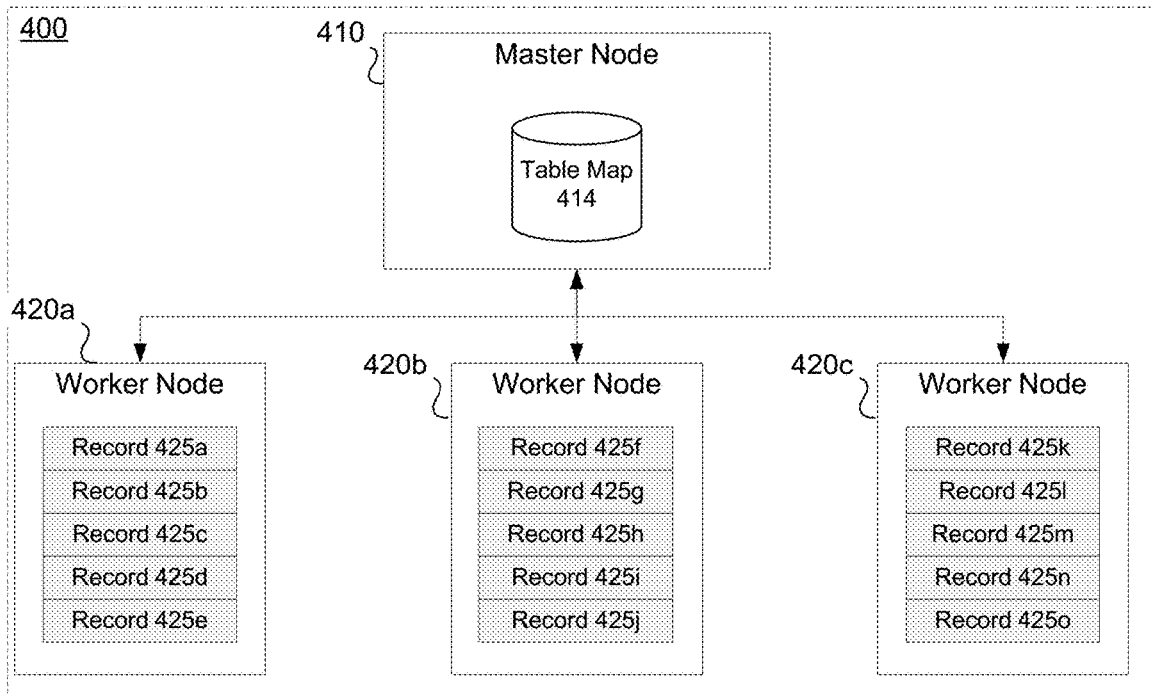
FIGS. 4A and 4B illustrate example database systems having parallel system architectures, where each database system has a plurality of nodes and records of the database are distributed among the plurality of nodes.
Figure 4B:
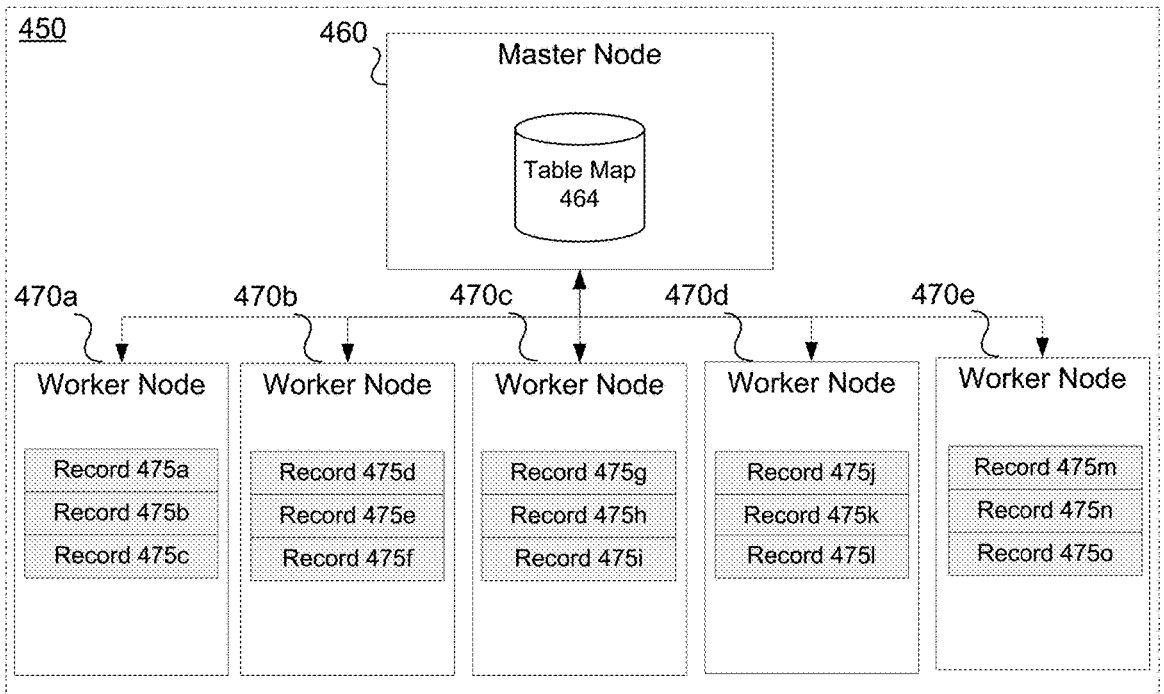

Another difference that may complicate the comparison of two databases having disparate parallel system architectures may be a difference in the number of nodes utilized in each database. For example, FIGS. 4A and 4B illustrate example databases 400 and 450 each having a plurality of worker nodes 420*a-c* and 470*a-e*, respectively. Database 400 may, for example, correspond to middleware database 320 of FIG. 3A. Database 400 is illustrated as having a master node 410 and three worker nodes 420*a-c* storing records 425*a-o*. Records 425*a-o* may be evenly distributed throughout the worker nodes, as illustrated in the example of FIG. 3A. Master node 410 may store a table map 414 (and/or any other suitable information) to keep track of had the records of database 400 are stored across the individual worker nodes. FIG. 4B illustrates database 450, which may correspond to data warehouse database 330 of FIG. 3A, for example. Database 450 may have five worker nodes 470*a-e* under command of a master node 460. Records 475*a-o* may correspond in content (but not necessarily form) to records 425*a-o* of FIG. 4A. Master node 460 may similarly store a table map and/or other suitable information to identify how the records in database 450 are stored across the worker nodes 470. As there are more worker nodes 470 in database 450 than there are in database 400, three records 475 may be stored at each worker node 470 in database 450 versus the five records 425 stored at each worker node 420 in database 400. Different numbers of nodes storing different numbers of records may present additional difficulty in comparing two databases that have disparate parallel structures.

Figure 5:
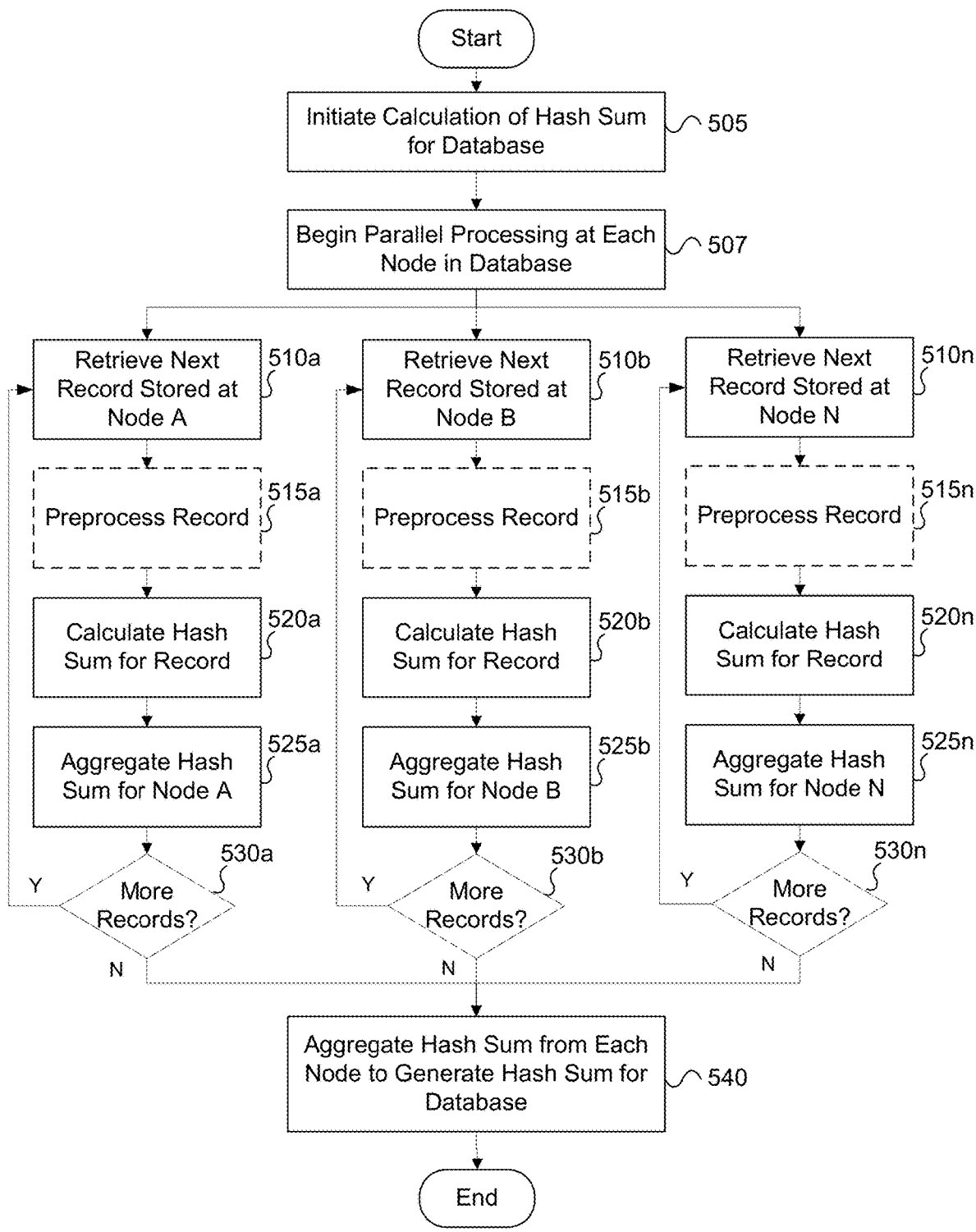
FIG. 5 illustrates an example parallel process flow according to one or more illustrative embodiments.

Having described several examples of databases having parallel system architectures and an example ETL data flow utilizing a middleware database, discussion will now turn to methods and systems for calculating a hash sum for a database having a parallel system architecture as illustrated in FIG. 5.

FIG. 5 illustrates a flowchart that depicts a method of calculating a hash sum for a database having a parallel system architecture through use of parallel processing. The method illustrated in FIG. 5 may be performed in any suitable parallel database system having a plurality of nodes that store and/or process a portion of the records stored in the database. In some embodiments, the example method illustrated in FIG. 5 may be performed by one or more computing devices, which may include and/or implement one or more aspects of computing device 101. In additional and/or alternative embodiments, the example method illustrated in FIG. 5 may be performed by a database system and/or a database management system that operates to manage and/or control database 200 of FIG. 2A. For example, the method may be performed by one or more central and/or master nodes 210 of database system 200. In other embodiments, the example method illustrated in FIG. 5 may be implemented in and/or may otherwise be embodied in computer-readable instructions that may be stored in a computer-readable medium, such as a memory. In the description that follows, the steps of the example method illustrated in FIG. 5 may be performed by a master node, such as master node 210, and the individual worker nodes of the database, such as worker nodes 220*a-c*. It will be understood that any step may be performed by any node, management system, and/or other device associated with the parallel-structured database without departing from the features and principles described herein.

At step 505, a master node may initiate calculation of a hash sum for the database. The master node may perform step 505 in response to a request from a user such as a data manager, for example. As another example, the master node may perform step 505 in response to a regularly scheduled data audit and/or as a result of an import of new data into the database. The master node may determine a subset of the records in the database to be used in calculating the hash sum based on user specified criteria and/or other set criteria. If a full database comparison is desired, the master node may proceed to initiate calculation of a hash sum for all the records stored in the database. In some embodiments, a user of the database system may specify a range and/or criteria for selecting a subset of all records stored at the individual node and/or in the database. For example, the calculation of a database hash sum for a first database may be limited to new records gathered in the last month. Any suitable criteria may be used to specify a subset of the records stored at the individual nodes and/or in the databases.

The master node may generate parallel processing instructions for individual nodes in the database. The instructions may be generated based on a table map, data definition, table definition, schema, and/or any other suitable information about the database and/or the parallel system architecture of the database. The instructions may instruct each individual node to calculate a node hash sum for records stored at the node. If appropriate, the instructions may include criteria for selecting a subset of a the plurality of records stored at the individual node, and the records used to determine a node hash sum may be a subset of all the records stored at the individual node.

In some embodiments, the instructions may identify a user defined hash function to be used by the individual nodes in calculating hash values for individual records. The user defined hash function, in some embodiments, may include executable code, script language, an executable application and/or applet, and the like. For example, the instructions may identify that the SHA-2 hash function using 512 bits (SHA-512) be used in calculation hash values. Similarly, the instructions may identify a user defined aggregation function to be used by the individual nodes in calculating a node hash sum from the hash values of the individual records, as will be described further below. For example, the instructions may identify that an exclusive-OR (XOR) associative operation should be used to join the hash values of individual records and generate a node hash sum for the individual node.

At step 507, the master node may transmit instructions to the plurality of worker nodes to begin parallel processing and calculate a set of node hash sums for each node of the plurality of worker nodes. An individual worker node may receive the parallel processing instructions from the master node and may begin calculating its respective node hash sum. The example method illustrated in FIG. 5 branches at this step to illustrate that the individual nodes begin processing their respective records in parallel. Although the discussion that follows will describe the steps taken by one individual node (steps 510*a*-530*a*), it should be understood that the plurality of nodes in the database each perform the steps of retrieving a record, preprocessing the record, calculating a hash value for the record, aggregating the hash value for the record with that of previous records, and advancing to the next record in the example method illustrated in FIG. 5.

At step 510*a*, the individual node retrieves the first (and/or next) record stored at the individual node. The record may be retrieved from memory associated with the individual node. Records may include one or more fields with various items of customer information stored in the database. As noted above, in a database implemented using a parallel system architecture, each individual node may store a portion of the records stored in the database. During parallel processing, each individual node may be responsible for calculating a hash sum for the records stored at that individual node.

At step 515*a*, the individual node may preprocess one or more fields of the current record. In some embodiments, the preprocessing may be based on one or more preprocessing rules associated with the parallel system architecture of the database. In some embodiments, preprocessing may include modifying a field of the one or more fields by casting a data type of the field to a different data type, removing trailing characters in the field, removing leading characters in the field, replacing one or more characters in field with replacement characters, and/or any other suitable form of preprocessing the record. For example, preprocessing may include removing and/or replacing one or more delimiters in the fields of the record.

Preprocessing may include concatenating at least two fields of the one or more fields to generate a record value. The record value may include all or a portion of the content of the record in a single value and may be a string of characters. The fields may be concatenated in an order different from a logical field order of the database. For example, a preprocessing rule associated with the parallel system architecture may specify concatenation logic for the fields of the records stored at each node. Although preprocessing rules and concatenation logic may differ for disparate types of parallel system architectures, the record value for a particular record generated by the preprocessing in one parallel system will generally be the same as the record value for that same particular record in a different parallel system. Thus, preprocessing may place the content of the record into a standard form. As a result, a standard representation of the content of the individual record may be used in calculating a hash value for the record, regardless of the particular type of parallel system architecture used in implementing the database.

At step 520a, the individual node may calculate a hash sum or hash value for the individual record. A standardized representation of the content of the record may be generated at step 515a and used as input to a hash function at step 520a. Any suitable hash function may be utilized to generate the hash value for each record in the database. A hash function may take a value as input and output a hash value having a fixed size. As one example, a suitable hash function for use herein may operate in a sufficiently large key space so as to guarantee that any two unique records should not map to the same hash value. For example, the hash function utilized to calculate a hash value for the individual records may be the SHA-256 function which generates hash values of 256 bits. In some embodiments, a user defined hash function may be utilized to compute the hash value for the individual record.

At step 525a, the individual node may aggregate the hash value for the individual record with a running hash sum for the individual node. For the first record processed by the node, the node hash sum may be set to the hash value for the first record. Alternatively and/or additionally, the record hash value may be further processed to generate the running node hash sum. The second and later records processed by the node may be combined with the running node hash sum using an aggregation function. That is, the hash value for the individual record may be combined with the hash values for any records previously calculated by the individual node during the parallel processing steps illustrated in FIG. 5. In some embodiments, an associative calculation, such as the exclusive-or (XOR) operation, may be used to combine the hash values for the individual records. In other embodiments, a user defined aggregation function may be used to combine the hash values.

At step 530a, the individual node may check to see if there are more records remaining for processing. The individual node may iterate over all records stored at the individual node and/or a subset of the records stored at the individual node based on the instructions received from the master node. If there are more records remaining, processing may return to step 510a and the individual node may retrieve the next record. The individual node may proceed to preprocess the next record at step 515a, calculate a hash value for the record at step 520a, and aggregate the hash value for that record with the running node hash sum generated by combining each prior hash value at step 525a. If there are no more records remaining, the individual node may transmit a final node hash sum to the master node. As can be seen from the steps described above in regard to the example method illustrated in FIG. 5, the hash values of each record processed at the individual node are combined to generate the node hash sum.

Steps 510-530 are similarly performed by each individual node of the plurality of nodes in the database. Each node iterates over the records stored at the node and generates a hash value for the individual records at steps 510-530a, 510-530b, and 510-530n. As the individual record hash values are generated, they are combined into a node hash value for the individual node. Once the node has iterated over all records stored at the node (or a subset of records stored at the node), a node hash sum representing the content of each processed record may be generated and transmitted to the master node for further processing.

At step 540, the master node may aggregate the node hash sums received from each individual node to generate a hash sum for the database. The master node may aggregate the node hash sums using an aggregation function. In some embodiments, the aggregation function used by the master node to aggregate the node hash sums may be the same as the aggregation function used by the individual nodes to aggregate the hash values for the individual records. In other embodiments, a different aggregation function may be used to aggregate the node hash sums. In some embodiments, an associative calculation, such as the exclusive-or (XOR) operation, may be used to combine the hash sums for the individual nodes. In other embodiments, a user defined aggregation function may be used to combine the node hash sums. By combining the node hash sum for each individual node of the plurality of nodes in the database, the master node may generate a database hash sum that corresponds to the content of the records in the database. As noted previously, this database hash sum may correspond to all records in the database or a subset of records based on various criteria.

The database hash sum generated according to the example method of FIG. 5 may be used to determine whether content of the database is equivalent to content of another database, even if that other database has a different parallel system architecture. An example process for comparing data stores on disparate parallel systems using hash sums generated according to the method of FIG. 5 is illustrated in FIG. 6 and will be discussed further below.

Figure 6:
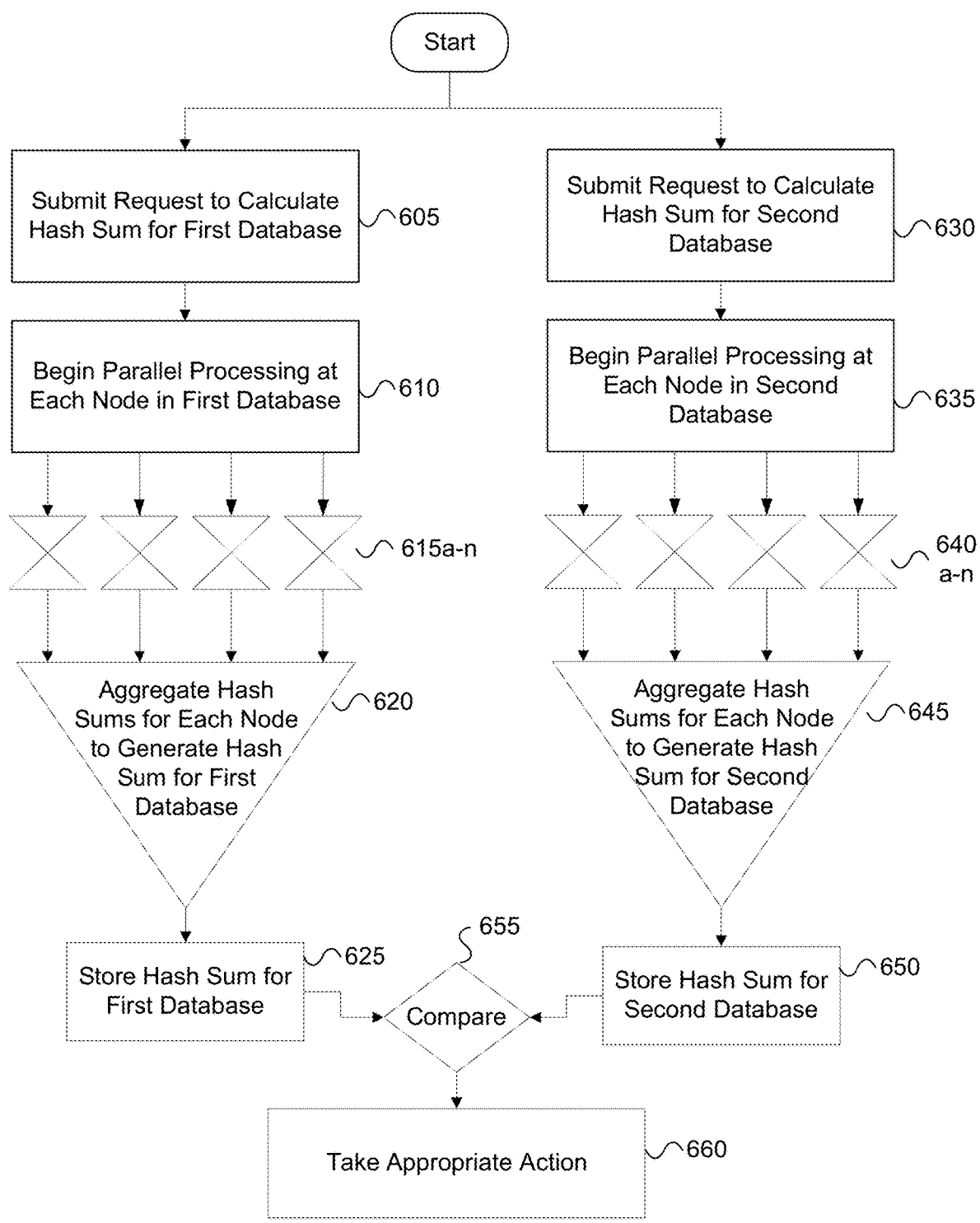
FIG. 6 illustrates a second example parallel process flow according to one or more illustrative embodiments.

The example method illustrated in FIG. 6 may compare the content of a first database having a first parallel system architecture with the content of a second database having a second parallel system architecture. The first database may, for example, store content in a first format, such as in a parallel file system. The second database may store the same content in a second format, such as in a parallel database. The second database may have been generated based on data imported from the first database, and it may be desirable to confirm that the content in the second database was accurately imported from the first database. By generating a database hash sum for each database, the system may compare the two database hash sums and determine whether the two have equivalent content. If the database hash values match, the data manager may be confident that the content of the two databases is equivalent to a very high degree of certainty. If the database hash values do not match, the data manager may initiate error checking and/or error correcting processes to identify and/or correct the mismatch(es) in the databases.

The method illustrated in FIG. 6 may be performed in any suitable parallel database system having one or more databases implemented using a parallel system architecture. The databases may have a plurality of nodes, and each node may have one or more processors and store a portion of the records of the database. In some embodiments, the database system may have two databases implemented using disparate parallel system architectures. In other embodiments, the database system may compare copies of the same database with the same parallel system architecture to detect whether data was copied accurately. The example method illustrated in FIG. 6 may be performed by one or more computing devices, which may include and/or implement one or more aspects of computing device 101. In additional and/or alternative embodiments, the example method illustrated in FIG. 6 may be performed by a database management system that operates to manage and/or control databases 200 and 250 of FIGS. 2A and 2B, and/or any other databases. For example, the method may be performed by a computing device in communication with one or more central and/or master nodes 210 and 260 of database systems 200 and 250. In other embodiments, the example method illustrated in FIG. 6 may be implemented in and/or may otherwise be embodied in computer-readable instructions that may be stored in a computer-readable medium, such as a memory.

At step 605, the database management system and/or other controller may begin a request to calculate a hash sum for a first database. The database management system may submit a request to a central and/or master node in the first database. The database management system may perform step 605 in response to a request from a user such as a data manager, for example. As another example, the database management system may perform step 605 in response to a regularly scheduled data audit and/or as a result of an import of new data into the first database or the second database. The database management system may determine a subset of the records in either database to be used in calculating the hash sum based on user specified criteria and/or other set criteria. If a full database comparison is desired, the database management system may proceed to initiate calculation of a hash sum for all the records stored in the first database. In some embodiments, a user of the database management system may specify a range and/or criteria for selecting a subset of all records stored at the individual node and/or in either database. For example, the calculation of a database hash sum for both databases may be limited to new records gathered in the last month. Any suitable criteria may be used to specify a subset of the records stored at the individual nodes and/or in the databases.

The request generated by the database management system may cause a master node of the first database to generate parallel processing instructions for individual nodes in the first database. Processing may proceed as illustrated in FIG. 5 and discussed above. The instructions may be generated based on a table map, data definition, table definition, schema, and/or any other suitable information about the database and/or the parallel system architecture of the first database. The instructions may instruct each individual node to calculate a node hash sum for records stored at the node. If appropriate, the instructions may include criteria for selecting a subset of a the plurality of records stored at the individual node, and the records used to determine a node hash sum may be a subset of all the records stored at the individual node.

In some embodiments, the request to calculate a hash sum for the first database may identify a user defined hash function to be used by the individual nodes in calculating hash values for individual records. The user defined hash function, in some embodiments, may include executable code, script language, an executable application and/or applet, and the like. For example, the instructions may identify that the SHA-256 hash function be used in calculation hash values. Similarly, the request may identify a user defined aggregation function to be used by the individual nodes in calculating a node hash sum from the hash values of the individual records, as will be described further below. For example, the instructions may identify that an XOR associative operation should be used to join the hash values of individual records and generate a node hash sum for the individual node.

At step 610, the master node in the first database may begin a parallel processing operation at each node in the first database. At steps 615a-n, each individual node in the first database may calculate a node hash sum as described above with regard to steps 510-530 of FIG. 5. According to some aspects, calculating a node hash sum for an individual node may include calculating, by a processor of the individual node, a set of hash values for each individual record of a plurality of records stored at the individual node. Calculating a hash value for an individual record may include retrieving the individual record, preprocessing one or more fields of the individual record to generate a record value (as described above in regard to FIG. 5), and calculating the hash value for the individual record based on the record value. The individual node may combine each hash value of the set of hash values to generate the node hash sum for the individual node. In some embodiments, the calculation of the set of node hash sums may include parallel processing by the individual nodes, wherein each individual node calculates a respective node hash sum of the respective individual node concurrently.

As a result, the master node may receive a set of node hash sums. At step 620, the master node may combine the node hash sums to generate a database hash sum for the first database. The master node may aggregate the node hash sums using an aggregation function, which may be specified by the database management system in the request to generate the database hash sum for the first database. In some embodiments, the aggregation function used by the master node to aggregate the node hash sums may be the same as the aggregation function used by the individual nodes to aggregate the hash values for the individual records. In other embodiments, a different aggregation function may be used to aggregate the node hash sums. In some embodiments, an associative calculation, such as the exclusive-or (XOR) operation, may be used to combine the hash sums for the individual nodes. In other embodiments, a user defined aggregation function may be used to combine the node hash sums. By combining the node hash sum for each individual node of the plurality of nodes in the first database, the master node may generate a database hash sum that corresponds to the content of the records in the first database. As noted previously, this database hash sum may correspond to all records in the first database or a subset of records based on various criteria and as specified in the request from the database management system.

At step 625, the database management system may store the first database hash sum corresponding to the first database.

At step 630, the database management system and/or other controller may begin a request to calculate a hash sum for a second database. In some embodiments, a first parallel system architecture of a first database may be of a first type and the second parallel system architecture of the second database may be of a second type different from the first type. For example, the first database may be a parallel file system such as an Apache Hadoop database and the second database may be a parallel database such as a Teradata database. As at step 605, the database management system may submit a request to a central and/or master node in the second database. Similarly, the database management system may perform step 630 in response to a request from a user such as a data manager, for example. As another example, the database management system may perform step 630 in response to a regularly scheduled data audit and/or as a result of an import of new data into the first database or the second database. The database management system may determine a subset of the records in either database to be used in calculating the hash sum based on user specified criteria and/or other set criteria. If a full database comparison is desired, the database management system may proceed to initiate calculation of a hash sum for all the records stored in the second database. In some embodiments, a user of the database management system may specify a range and/or criteria for selecting a subset of all records stored at the individual node and/or in either database. For example, the calculation of a database hash sum for both databases may be limited to new records gathered in the last month. Any suitable criteria may be used to specify a subset of the records stored at the individual nodes and/or in the databases.

As described above in regard to step 605, the request generated by the database management system may cause a master node of the second database to generate parallel processing instructions for individual nodes in the first database. Processing may proceed as illustrated in FIG. 5 and discussed above. The instructions may be generated based on a table map, data definition, table definition, schema, and/or any other suitable information about the database and/or the parallel system architecture of the second database. In particular, the instructions generated for the second database at step 630 may differ from the instructions generated for the first database at step 605 based on the different parallel system architecture employed by the second database. For example, the instructions may specify different preprocessing logic or may represent the desired subset of records in a format suitable for the second architecture. As one example, the first database may accept SQL queries while the second database may accept queries in another format. The instructions for the first and second databases may specify that a same hash function be used on standardized record values and that a same logic be employed in aggregating the hash value for individual records. However, some parallel systems may require different formats and/or encodings for user defined functions. For example, a first parallel system architecture may accept user defined functions in C++ code while a second parallel system architecture only accepts Java code functions. While the two user defined functions may be represented in different manners, the functions may be written to have an equivalent functionality and maintain integrity of results across the two disparate systems.

At step 635, the master node in the second database may begin a parallel processing operation at each node in the second database. At steps 640*a-n*, each individual node in the second database may calculate a node hash sum as described above with regard to steps 510-530 of FIG. 5 and steps 615*a-n*. However, the preprocessing step may be performed differently on the second database based on differences between the first parallel system architecture and the second parallel system architecture. For example, where the first parallel system architecture is a parallel file structure, preprocessing may include removing delimiter characters from a file record. Where the second parallel system architecture is a parallel database storing data in tabular format, for example, removing delimiter characters may be unnecessary and preprocessing may include replacing null characters with a place holder value (such as a reserved 1-byte place holder value).

As another example regarding preprocessing in the first and second database, the first database may store a customer's name as a single field—"Last, First". In a second database, continuing the example, the customer's name may be stored as two fields—"First" and "Last". Preprocessing in the first database may include removing the comma (","). Preprocessing in the second database may include concatenating the last name field with the first name field in the proper order and adding a space between the two. As a result of preprocessing, the record may be transformed into a standardized representation and a hash value of that record may be validly compared with a hash value of the corresponding record in the other database.

At step 645, the master node in the second database may combine the node hash sums from the nodes in the second database to generate a database hash sum for the second database. The master node may aggregate the node hash sums using an aggregation function, which may be specified by the database management system in the request to generate the database hash sum for the second database. By combining the node hash sum for each individual node of the plurality of nodes in the second database, the master node may generate a database hash sum that corresponds to the content of the records in the second database. As noted previously, this database hash sum may correspond to all records in the second database or a subset of records based on various criteria and as specified in the request from the database management system.

Although various steps of FIG. 6 are described as being performed by a master node in the first database or the second database, it should be understood that some or all of these steps may be performed by the database management system without departing from the features and principles described herein. For example, the database management system may receive the set of node hash sums from the nodes of the first and/or second databases and generate the database hash sum for the first database and/or second database, respectively.

At step 650, the database management system may store the second database hash sum corresponding to the second database.

At step 655, the database management system may compare the first database hash sum with the second databased hash sum and take appropriate action at step 660. Based on the comparison, a master node may determine whether content of the two databases is equivalent, for example. Any other appropriate action may be taken based on a result of the comparison. As one other example, the system may initiate error checking to detect a portion of the content of the database that does not match the source database when the hash sums do not match.

A hash sum for a database that was computed for a subset of the records in the database may be compared with a hash sum for another database that was computed over a corresponding subset of records in the other database. For example, the calculation of a first database hash sum for a first database may be limited to new records gathered in the last month, and the first database hash sum may be compared with a second database hash sum for a second database that was similarly limited to records gathered in the last month. Any other suitable criteria may be used to specify a subset of the records stored at the individual nodes and/or in the databases.

Having discussed an example method for calculating hash sums and comparing data stored in disparate parallel systems, as illustrated in FIG. 6, discussion will now turn to an example embodiment of some aspects described herein.

In an example embodiment, the hash sum calculation process for a first database having a first parallel system architecture may begin with acquisition of the file definition and/or table definition from a data dictionary. Using parallel processing, each individual node in the database may iterate over records stored at the individual node. The individual node may perform a preprocessing step, a hash sum calculation step, and an aggregation step for each record stored at the individual node. The preprocessing step may include preprocessing one or more fields of the record based on a set of rules associated with the first parallel system architecture. For example, in one embodiment the set of rules associated with the first parallel system architecture may include (1) if the field is not a character field, cast it to a character data type; (2) if the first contains a null, substitute a default character value for the null; (3) remove leading and trailing blanks in the field; and (4) concatenate all of the fields of the record to generate a single record value.

Having generated a standardized representation of the record in the single record value, in some embodiments the individual node may generate a hash value for the record using a hash function. The hash function may be, for example, a SHA-256 hash function implemented as a user-defined function in the operating environment of the first database. The individual node may combine the hash value for the record with hash values that have been calculated for other records stored at the individual node, and the process may iterate until hash values for each record stored at the individual node have been calculated and combined to generate a final node hash sum. The hash values may be combined using an associative calculation (such as the exclusive-OR operation) that may be specified using a user-defined aggregation function in the operating environment of the first database. Once a set of node hash sums for the individual nodes in the first database has been calculated, the node hash sums may be combined to generate a single database hash sum for the file/table storing the data in the first database. The node hash sums may be combined to generate the database hash sum using an aggregation function similarly to that described above with respect to the hash values for the individual records. Finally, the system may output, store, and/or perform further processing on the database hash sum for the first database. For example, the system may compare the database hash sum for the first database with a hash sum for a source database that was used to create the first database. If the two hash sums match, then the system may determine that the content of the first database and the source database are equivalent.

As described above, database hash sums may be calculated by each of a plurality of nodes in a database acting in parallel. The individual record hash values and the node hash sums may be aggregated using any suitable aggregation function. One such aggregation function is the exclusive-OR (XOR) function. The exclusive-OR function may quickly and efficiently generate an aggregated hash sum from one or more hash values. However, the exclusive-OR function (and some other aggregation functions) may fail to accurately account for duplicate records in a database. Duplicate records will hash to the same hash value. With XOR, for example, combining the two hash values for the duplicate records will result in a NULL value. Any other values XOR'd with the NULL will similarly evaluate to NULL. As a result of the duplicate records, the method will fail to generate a usable hash sum that uniquely reflects the content of the database.

Thus, in some embodiments, the method may further involve calculating a second hash sum for the database (or each database) using a second aggregation function. An example of such methods are illustrated in FIGS. 7 and 8.

Figure 7:
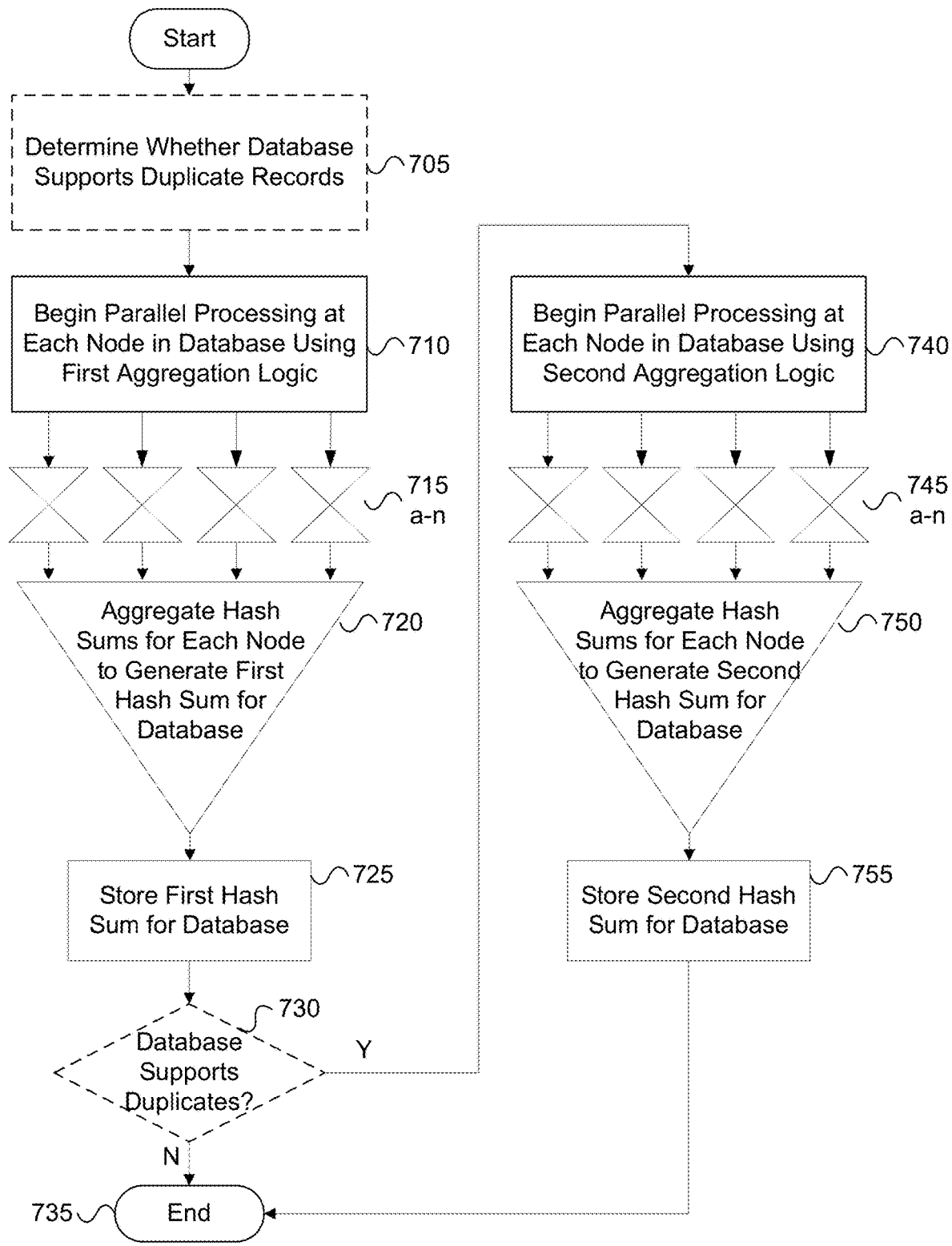
FIG. 7 illustrates a third example parallel process flow according to one or more illustrative embodiments.
Figure 8:
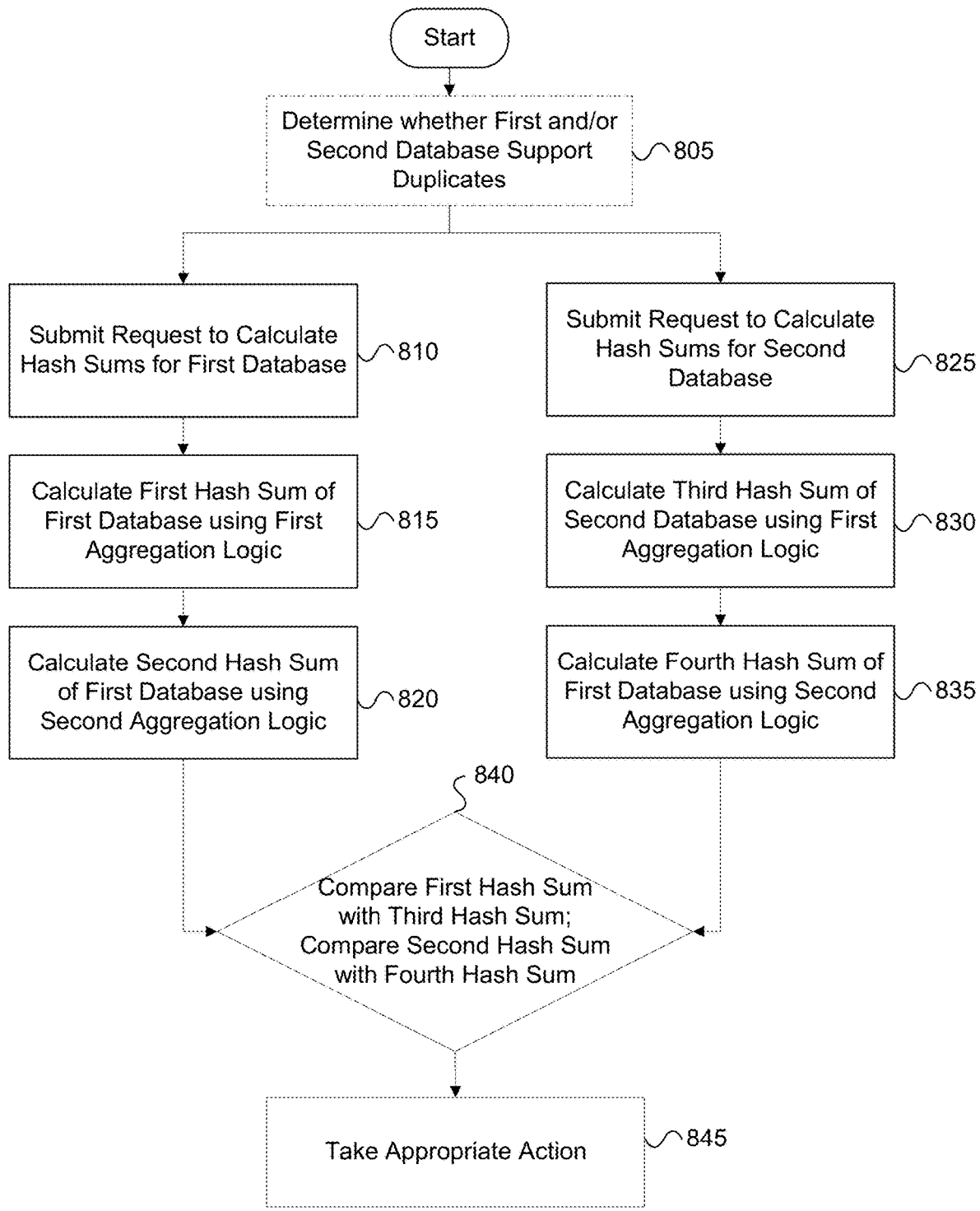
FIG. 8 illustrates a fourth example parallel process flow according to one or more illustrative embodiments.

The example methods illustrated in FIGS. 7 and 8 may be used to accurately compare the content of a first database having a first parallel system architecture with the content of a second database having a second parallel system architecture when either or both of the databases may contain duplicate records. According to some aspects described herein, the method may determine whether the database supports duplicate records. The method may include calculating a first database hash sum for the database using first aggregation logic and, when the database supports duplicates, calculating a second database hash sum for the database using second aggregation logic different from the first aggregation logic. As one example, the first aggregation logic may include performing a bitwise exclusive-OR (XOR) function to aggregate hash values of individual records as well as hash sums for each individual node of the database. As another example, the second aggregation logic may include performing an arithmetic summation function and a data conversion from a 64-byte hash value to one or more base 10 numbers. The summation function may then be used to aggregate hash values of individual records as well as hash sums for each individual node of the database. As will be described further below, numerous variations are possible without departing from the techniques described herein.

The methods illustrated in FIGS. 7 and 8 may be performed in any suitable parallel database system having one or more databases implemented using a parallel system architecture. The databases may have a plurality of nodes, and each node may have one or more processors and store a portion of the records of the database. In some embodiments, the database system may have two databases implemented using disparate parallel system architectures. In other embodiments, the database system may compare copies of the same database with the same parallel system architecture to detect whether data was copied accurately. The example methods illustrated in FIGS. 7 and 8 may be performed by one or more computing devices, which may include and/or implement one or more aspects of computing device 101. In additional and/or alternative embodiments, the example methods illustrated in FIGS. 7 and 8 may be performed by a database management system that operates to manage and/or control databases 200 and 250 of FIGS. 2A and 2B, and/or any other databases. For example, the method may be performed by a computing device in communication with one or more central and/or master nodes 210 and 260 of database systems 200 and 250. In other embodiments, the example methods illustrated in FIGS. 7 and 8 may be implemented in and/or may otherwise be embodied in computer-readable instructions that may be stored in a computer-readable medium, such as a memory.

Turning to the method illustrated in FIG. 7, a computing device may calculate two hash sums for a database using two different aggregation functions. This may be done, according to some aspects, to protect against a weakness of one of the aggregation functions. For example, the exclusive-OR (XOR) function may be a fast and efficient aggregation function and may work for most databases. However, the XOR function may fail to produce useful results if the database includes duplicate rows. A second aggregation function, such as an arithmetic sum function, may be used to protect against the case that the database includes duplicate rows.

At step 705, the system optionally determines whether the database supports duplicate records. This may be done, for example, by referring to a setting and/or environmental variable that identifies whether the database will accept duplicate records. For example, in a table-oriented database, such as the Teradata database, the configuration may include a Boolean flag indicating whether the database will accept duplicate records. This may also be determined based on the type of parallel architecture associated with the database. For example, certain database types will be known to those of skill in the art as not accepting duplicate records. Other techniques still are possible for determining whether the database supports duplicates. For example, the system may attempt to create a duplicate record and determine a result. In some embodiments, the computing device may determine that the second database, to which the current database is to be compared, supports duplicates and may proceed with the calculation of dual hash sums so that content of the current database may be accurately compared to the second database. In other embodiments, this step may be omitted and the computing device may compute the dual hash sums regardless of whether the database supports duplicates. This may be done to pre-generate the second hash sum in case a later database is found to support duplicates and the current database needs to be compared to the later database, for example.

At step 710, the system may initiate parallel processing at each node of a plurality of nodes in the database using first aggregation logic to generate a first database hash sum for the database. The first aggregation logic may be a general-purpose aggregation function that is suitable to quickly and efficiently aggregate hash values for individual records and hash sums for individual nodes of the database. For example, the first aggregation logic may include an exclusive-OR (XOR) operation. In some embodiments, the first aggregation logic may be implemented using a user-defined function provided by an administrator during configuration of the system and/or upon requesting the calculation of the database hash sums.

At steps 715*a-n*, the individual nodes of the database may each generate a node hash sum based on the individual records stored at the respective nodes. As described above, a node may generate a node hash sum by iterating over each record stored at the node and combining a hash value for a record with a running hash sum for the node. The method may involve preprocessing each record based on one or more preprocessing rules associated with the parallel architecture system used to implement the database. A hash value may be generated for an individual record stored at the node, and the node may use the first aggregation logic to combine the hash value for the individual record with a running hash sum for the node corresponding to the previously processed records. For example, the system may use the exclusive-OR function to combine the record hash value with a hash sum of the previously processed records or an initialized value. The node may continue iterating over the records until all records have been processed and combined into the node hash sum.

At step 720, the system obtains each node hash sum and may combine the node hash sums to generate a first database hash sum using the first aggregation logic. For example, the system may use the exclusive-OR function to combine each node hash sum to generate a first database hash sum for the database. At step 725, the system may store the first database hash sum for later use in comparing the database with another database.

At step 730, the method may optionally branch based on whether it was determined that the database supports duplicates. If the database does not support duplicates, the method may optionally end at step 735 without calculating a second database hash sum. In some embodiments, the system may proceed to calculate the second database hash sum regardless of whether the database supports duplicates. Although step 705 is illustrated first in the example method of FIG. 7, it will be understood that the system may determine whether the database supports duplicate records at any suitable time. For example, the system may determine whether the database supports duplicate records after calculating the first database hash sum.

At step 740, the system may initiate parallel processing at each node of the plurality of nodes in the database using second aggregation logic to generate a second database hash sum for the database. The second aggregation logic may be different from the first aggregation logic and may be a robust aggregation function suitable for calculating a hash sum for a set of records that may contain duplicate records, such as an arithmetic summation function. For example, the second aggregation logic may include a routine that converts the hash value into one or more numbers and adds the one or more numbers to a running hash sum for the node. In a specific example, the second aggregation logic may include converting a 64-byte hash value into integers (or other numeric data type) and adding the integers to a running hash sum for the node. The conversion may transform the binary representation of the hash value into a base-10 numeric representation. In some embodiments, the second aggregation logic may be implemented using a user-defined function provided by an administrator during configuration of the system and/or upon requesting the calculation of the database hash sums.

At steps 745*a-n*, the individual nodes of the database may each generate a node hash sum based on the individual records stored at the respective nodes, this time using the second aggregation logic instead of the first aggregation logic. As described above, a node may generate a node hash sum by iterating over each record stored at the node and combining a hash value for a record with a running hash sum for the node. The method may involve preprocessing each record based on one or more preprocessing rules associated with the parallel architecture system used to implement the database. A hash value may be generated for an individual record stored at the node, and the node may use the second aggregation logic to combine the hash value for the individual record with a running hash sum for the node corresponding to the previously processed records. For example, the system may use an arithmetic summation function to combine the record hash value with a hash sum of the previously processed records or an initialized value. The node may continue iterating over the records until all records have been processed and combined into the node hash sum.

At step 750, the system obtains each node hash sum (calculated by each node using the second aggregation logic) and may combine the node hash sums to generate a second database hash sum using the second aggregation logic. For example, the system may use an arithmetic summation function to combine each node hash sum to generate the second database hash sum for the database. At step 755, the system may store the second database hash sum for later use in comparing the database with another database, and the method may terminate at step 735.

Although the calculation of the second database hash sum (in steps 740-755) is illustrated in the example method of FIG. 7 as occurring after calculation of the first database hash sum (in steps 710-725), it should be understood that these steps may be combined and/or may happen in parallel. For example, the system may initiate calculation of both the first database hash sum and the second database hash sum in a single request. A parallel processing operation may be structured such that the operation calculates both the first and second database hash sum. For example, the individual nodes may calculate both database hash sums in a single process by retrieving a record, preprocessing the record according to any rules associated with the database, generating a hash value for the record, combining the hash value with a first running node hash sum using the first aggregation logic, combining the hash value with a second running node hash sum using the second aggregation logic, and iterating over the remaining records. The system may then aggregate both sets of node hash sums using the respective aggregation logic to generate both the first database hash sum and the second database hash sum.

The dual hash sum method of FIG. 7 may be used to compare two databases, for example, according to a method such as the method illustrated in FIG. 8. The method illustrated in FIG. 8 may be used to compare a first database having a first parallel system architecture with a second database having a second parallel system architecture. As a result of the comparison, the system may be able to determine whether content of the two databases is equivalent. For example, the first database may be an intermediate database implemented using a file-oriented structure (such as Hadoop) and the second database may be a data warehouse database implemented using a table-oriented structure (such as Teradata database). The second database may include content copied from the first database, for example as part of an ETL process.

At optional step 805, the system may determine whether one and/or both of the databases supports duplicate records. As in step 705 above, this may be done, for example, by referring to a setting and/or environmental variable that identifies whether the database will accept duplicate records. In some embodiments, the computing device may determine that either the first database or the second database, to which the first database is to be compared, supports duplicates and may proceed with the calculation of dual hash sums so that content of the databases may be accurately compared. In other embodiments, this step may be omitted and the computing device may compute the dual hash sums regardless of whether the database supports duplicates.

At step 810, the system may submit a request to begin and/or initiate calculation of hash sums for the first database. The system may calculate two hash sums for the first database using a method such as that illustrated in FIG. 7 and discussed above. At step 815 the system may calculate a first database hash sum for the first database using first aggregation logic. For example, the system may initiate a parallel processing operation on each node in the first database to generate an aggregate hash sum for the first database using an exclusive-OR function to aggregate hash values of individual records and nodes. At step 820 the system may calculate a second database hash sum for the first database using second aggregation logic. For example, the system may initiate a parallel processing operation on each node in the first database to generate an aggregate hash sum for the first database using an arithmetic summation function to aggregate hash values of individual records and nodes.

At step 825, the system may submit a request to begin and/or initiate calculation of hash sums for the second database. The system may calculate two hash sums for the second database using a method such as that illustrated in FIG. 7 and discussed above. At step 830 the system may calculate a third database hash sum for the second database using the same first aggregation logic. For example, the system may initiate a parallel processing operation on each node in the second database to generate an aggregate hash sum for the second database using an exclusive-OR function to aggregate hash values of individual records and nodes. At step 835 the system may calculate a fourth database hash sum for the second database using the same second aggregation logic. For example, the system may initiate a parallel processing operation on each node in the second database to generate an aggregate hash sum for the second database using an arithmetic summation function to aggregate hash values of individual records and nodes.

At step 840, the system may compare the database hash sums calculated for each database. The hash sums generated using the first aggregation logic (the first database hash sum and the third database hash sum) may be compared to each other and the hash sums generated using the second aggregation logic (the second database hash sum and the fourth database hash sum) may be compared to each other. In some embodiments, the system may determine whether the respective hash sums for each database match the other database, and may determine that the content of the two databases is equivalent when both pairs of hash sums match. In other embodiments, the system may first compare the first database hash sum with the third database hash sum (both generated using the first aggregation logic). If these two hash sums do not match, the system may determine that content of the two databases is not equivalent. If the first and third database hash sums do match, the system may compare the second database hash sum with the fourth database hash sum to detect a false positive due to duplicate records, for example. In other embodiments, the system may utilize the first and third database hash sums to compare the two databases when it is determined that neither database supports duplicate records, while the system may utilize the second and fourth database hash sums to compare the two databases when it is determined that either or both databases support duplicate records.

At step 845, the system may take any suitable action. For example, the system may determine that content of the two databases is not equivalent and may initiate corrective action such as re-importing all or a portion of the data set. As another example, the system may alert an administrator that the content of the two databases is not equivalent.

As noted above, the techniques described herein may calculate a hash sum for all of the records in a database or may be limited to a subset of the records in the database. For example, an administrator may request that the system limit its hash sum calculations and comparison to a subset of records in either database matching certain criteria. For example, the administrator may specify that data having a certain date value and/or falling with a given date or time range be considered by the methods and techniques described herein. In such an embodiment, the database and/or the individual nodes may process the criteria to determine a subset of the records in the database for use in calculating the hash sum for the database. This hash sum may be compared to a hash sum for a corresponding subset in another database to determine whether the content of the subsets is equivalent. This may be useful where, for example, there are a very large number of records in either database and an update only impacted a limited range of records. This may also be useful where one database contains fewer records than the other, such as where an intermediate database is used to move new records into a larger data warehousing database.

As one example of an embodiment according to some aspects described herein and above with regard to FIGS. 7 and 8, a database management system may operate to compare an intermediate database implemented using a file-oriented database architecture, such as Hadoop, to a data warehousing database implemented using a table-oriented database architecture, such as Teradata database. If the system determines that neither the intermediate database or the data warehousing database are configured to support duplicates, the system may proceed to calculate a database hash sum for each database using an efficient aggregation function, such as the exclusive-OR (XOR) function. If the system determines that either or both databases are configured to support duplicates, the system may determine that dual hash sums should be calculated. The system may proceed to use parallel processing to calculate first hash sums for the databases using a first aggregation function, such as the XOR function, and to calculate second hash sums for the databases using a second aggregation function, such as an arithmetic summation function. After both sets of hash sums have been generated, the system may compare the respective first hash sums (generated using the first aggregation logic) to each other and the respective second hash sums (generated using the second aggregation logic) to each other. If both sets of hash sums match, the system may determine that the first and second databases include equivalent content and are a "good copy." If either set of hash sums do not match, the system may initiate remedial action to correct any errors in the data set of either database.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Further, various aspects described herein may be implemented using a wrapper function and/or user-defined function allowing an administrator to initiate calculation of one or more hash sums for a database by way of a function call. The wrapper function may accept as a parameter a table name and option criteria for selecting a subset of the records contained therein.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A database management system comprising:
a first database having a first parallel system architecture that comprises a parallel file system, the first database comprising a first indicator that corresponds to whether the first database is configured to support duplicate records;
a second database having a second parallel system architecture different from the first parallel system architecture, wherein the second parallel system architecture comprises a parallel database, the second database comprising a second indicator that corresponds to whether the second database is configured to support duplicate records;
a first plurality of nodes, each node of the first plurality of nodes comprising a processor configured to preprocess a first field of each of a first plurality of records stored in the first database;
a second plurality of nodes, each node of the second plurality of nodes comprising a processor configured to preprocess a second field of each of the second plurality of records stored in the second database; and
a master node comprising:
at least one processor; and
memory storing computer readable instructions that, when executed by the at least one processor, configure the master node to:
initiate preprocessing, by each node of the first plurality of nodes based on a first preprocessing rule corresponding to the first parallel system architecture, the first field of each of the first plurality of records stored in the first database;
initiate generation, by each node of the first plurality of nodes, a first record value for each preprocessed record of the first plurality of records;
initiate preprocessing, by each node of a second plurality of nodes based on a second preprocessing rule corresponding to the second parallel system architecture, a second field of each of a second plurality of records stored in the second database;
initiate generation, by each node of the second plurality of nodes, a second record value for each preprocessed record of the second plurality of records;
calculating, by a master node and based on a determination that at least one of the first database or the second database is configured to support duplicate records for the first database, a first database hash sum for the first database, wherein the first database hash sum is an aggregation of a plurality of first hash sums, each of the plurality of hash sums being calculated by parallel processing on a different first node of the first plurality of nodes of the first database;
calculating, by the master node and based on the determination that the first database or the second database are configured to support duplicate records for the first database, a second database hash sum for the second database, wherein the second database hash sum is an aggregation of a plurality of second hash sums, each of the plurality of second hash sums being calculated by parallel processing on a different second node of the second plurality of nodes of the second database;
comparing the first database hash sum and the second database hash sum; and
determining whether first content of the first database is equivalent to second content of the second database based on a result of the comparison.

2. The database management system of claim 1, wherein the first parallel system architecture is a table-oriented parallel architecture and wherein the second parallel system architecture is a file-oriented parallel architecture.

3. The database management system of claim 1, wherein the instructions further configure the master node to:
determine that content in the first database is equivalent to content in the second database when the first database hash sum matches the second database hash sum.

4. The database management system of claim 1, wherein the first database hash sum and the second database hash sum are calculated using a first aggregation function and wherein the instructions further configure the master node to:
based on a determination that one of the first database or the second database is configured to support duplicate records:
initiate calculation of a third database hash sum for the first database, wherein the third database hash sum is calculated by parallel processing on the first plurality of nodes using a second aggregation function different from the first aggregation function; and
initiate calculation of a fourth database hash sum for the second database, wherein the fourth database hash sum is calculated by parallel processing on the second plurality of nodes using the second aggregation function; and
determine that content in the first database is equivalent to content in the second database when the first database hash sum matches the second database hash sum and the third database hash sum matches the fourth database hash sum.

5. The database management system of claim 1, wherein initiating calculation of the first database hash sum for the first database comprises:
initiating parallel calculation of a set of node hash sums for each individual node of the first plurality of nodes, wherein calculating a node hash sum for an individual node comprises:
calculating, by a processor of the individual node, a set of hash values for each individual record of a plurality of records stored at the individual node; and
combining each hash value of the set of hash values to generate the node hash sum for the individual node; and
combining each node hash sum of the set of node hash sums to generate the first database hash sum.

6. The database management system of claim 1, wherein preprocessing a first field of each of the first plurality of records stored in the first database comprises modifying the field by at least one of:
casting a data type of the field to a different data type;
removing trailing characters in the field;
removing leading characters in the field; and
replacing one or more characters in the field with replacement characters.

7. The database management system of claim 1, wherein the first database hash sum is calculated using a user defined hash function.

8. A master node comprising:
a processor; and
memory storing computer readable instructions that, when executed by the processor, cause the master node to:
initiate execution of instructions to preprocess, by each node of a first plurality of nodes based on a first preprocessing rule corresponding to a first parallel system architecture, a first field of each of a first plurality of records stored in a first database, wherein the first parallel system architecture accepts user defined functions encoded in a first computing language and wherein the first database comprises a first indicator that corresponds to whether the first database is configured to support duplicate records;
initiate execution of instructions to generate, by each node of the first plurality of nodes, a first record value for each preprocessed record of the first plurality of records;
initiate execution of instructions to preprocess, by each node of a second plurality of nodes based on a second preprocessing rule corresponding to a second parallel system architecture, a second field of each of the second plurality of records stored in a second database, wherein the second parallel system architecture only accepts user defined functions encoded in a second computing language different from the first computing language and wherein the second database comprises a second indicator that corresponds to whether the second database is configured to support duplicate records;
initiate execution of instructions to generate, by each node of the second plurality of nodes, a second record value for each preprocessed record of the second plurality of records;
calculate, based on a determination that at least one of the first database or the second database is configured to support duplicate records for the first database, a first database hash sum for the first database, wherein the first database hash sum is an aggregation of a plurality of first hash sums, each of the plurality of first hash sums being calculated by parallel processing on a different first node of the first plurality of nodes of the first database;
calculate, based on a determination that at least one of the first database or the second database is configured to support duplicate records for the first database, a second database hash sum for the second database, wherein the second database hash sum is an aggregation of a plurality of second hash sums, each of the plurality of second hash sums being calculated by parallel processing on a different second node of the second plurality of nodes of the second database; and
determine whether first content of the first database is equivalent to second content of the second database based on a result of a comparison the first database hash sum to the second database hash sum.

9. The master node of claim 8, wherein the first parallel system architecture is a table-oriented parallel architecture and wherein the second parallel system architecture is a file-oriented parallel architecture.

10. The master node of claim 8, wherein the instructions further configure the master node to:

determine that content in the first database is equivalent to content in the second database when the first database hash sum matches the second database hash sum.

11. The master node of claim 8, wherein the first database hash sum and the second database hash sum are calculated using a first aggregation function and wherein the instructions further configure the master node to:
based on a determination that one of the first database or the second database is configured to support duplicate records:
initiate calculation of a third database hash sum for the first database, wherein the third database hash sum is calculated by parallel processing on the first plurality of nodes using a second aggregation function different from the first aggregation function; and
initiate calculation of a fourth database hash sum for the second database, wherein the fourth database hash sum is calculated by parallel processing on the second plurality of nodes using the second aggregation function; and
determine that content in the first database is equivalent to content in the second database when the first database hash sum matches the second database hash sum and the third database hash sum matches the fourth database hash sum.

12. The master node of claim 8, wherein initiating calculation of the first database hash sum for the first database comprises:
initiating parallel calculation of a set of node hash sums for each individual node of the first plurality of nodes, wherein calculating a node hash sum for an individual node comprises:
calculating, by a processor of the individual node, a set of hash values for each individual record of a plurality of records stored at the individual node; and
combining each hash value of the set of hash values to generate the node hash sum for the individual node; and
combining each node hash sum of the set of node hash sums to generate the first database hash sum.

13. The master node of claim 8, wherein initiating preprocessing the first field of each of the first plurality of records stored in the first database comprises initiating modification of the field by at least one of:
casting a data type of the first field to a different data type;
removing trailing characters in the first field;
removing leading characters in the first field; and
replacing one or more characters in the first field with replacement characters.

14. The master node of claim 13, wherein initiating preprocessing of the second field of each of the second plurality of records stored in the second database comprises initiating modification of the second field by at least one of:
casting a data type of the second field to a different data type;
removing trailing characters in the second field;
removing leading characters in the second field; and
replacing one or more characters in the second field with replacement characters.

15. The master node of claim 8, wherein the first database hash sum is calculated using a user defined hash function.

16. A method comprising:
preprocessing, by each node of a first plurality of nodes based on a first preprocessing rule corresponding to a first parallel system architecture, a first field of each of a first plurality of records stored in a first database, wherein the first parallel system architecture comprises a parallel file structure;
generating, by each node of the first plurality of nodes, a first record value for each preprocessed record of the first plurality of records language and wherein the first database comprises a first indicator that corresponds to whether the first database is configured to support duplicate records;
preprocessing, by each node of a second plurality of nodes based on a second preprocessing rule corresponding to a second parallel system architecture, a second field of each of a second plurality of records stored in a second database, wherein the second parallel system architecture comprises a parallel database stored in a tabular format and wherein the second database comprises a second indicator that corresponds to whether the second database is configured to support duplicate records;
generating, by each node of the second plurality of nodes, a second record value for each preprocessed record of the second plurality of records;
calculating, by a master node using a first aggregation function and based on a determination that at least one of the first database or the second database is configured to support duplicate records for the first database, a first database hash sum for the first database, wherein the first database hash sum is an aggregation of a plurality of first hash sums, each of the plurality of first hash sums being calculated by parallel processing on a different first node of the first plurality of nodes of the first database;
calculating, by the master node using a first aggregation function and based on a determination that at least one of the first database or the second database is configured to support duplicate records for the first database, a second database hash sum for the second database, wherein the second database hash sum is an aggregation of a plurality of second hash sums, each of the plurality of second hash sums being calculated by parallel processing on a different second node of the second plurality of nodes of the second database;
comparing, by the master node, the first database hash sum and the second database hash sum; and
determining, by the master node, whether first content of the first database is equivalent to second content of the second database based on a result of the comparison.

17. The method of claim 16, wherein the first parallel system architecture is a table-oriented parallel architecture and wherein the second parallel system architecture is a file-oriented parallel architecture.

18. The method of claim 16, comprising:
determining, by the master node, that content in the first database is equivalent to content in the second database when the first database hash sum matches the second database hash sum.

19. The method of claim 16, further comprising:
based on a determination that one of the first database or the second database is configured to support duplicate records:
calculating, by the first plurality of nodes, a third database hash sum for the first database, wherein the third database hash sum is calculated by parallel processing on the first plurality of nodes using a second aggregation function different from the first aggregation function; and
calculating, by the second plurality of nodes, a fourth database hash sum for the second database, wherein the fourth database hash sum is calculated by parallel processing on the second plurality of nodes using the second aggregation function; and determining, by the master node, that content in the first database is equivalent to content in the second database when the first database hash sum matches the second database hash sum and the third database hash sum matches the fourth database hash sum.

20. The method of claim 16, wherein preprocessing a first field of each of the first plurality of records stored in the first database comprises modifying the field by at least one of:

casting a data type of the field to a different data type;
removing trailing characters in the field;
removing leading characters in the field; and
replacing one or more characters in the field with replacement characters.

* * * * *